(12) United States Patent
Nishihara et al.

(10) Patent No.: US 8,565,615 B2
(45) Date of Patent: Oct. 22, 2013

(54) OPTICAL MODULATION APPARATUS AND OPTICAL MODULATION METHOD

(75) Inventors: Masato Nishihara, Kawasaki (JP); Tomoo Takahara, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 142 days.

(21) Appl. No.: 13/048,148

(22) Filed: Mar. 15, 2011

(65) Prior Publication Data

US 2011/0229148 A1  Sep. 22, 2011

(30) Foreign Application Priority Data

Mar. 19, 2010  (JP) .................................. 2010-064530

(51) Int. Cl.
*H04B 10/04* (2011.01)
*H04B 17/00* (2006.01)
*H04J 14/02* (2006.01)

(52) U.S. Cl.
USPC ............. 398/183; 398/94; 398/182; 398/184; 398/197; 398/38

(58) Field of Classification Search
None
See application file for complete search history.

(56) References Cited

U.S. PATENT DOCUMENTS

| | | | | |
|---|---|---|---|---|
| 5,448,392 | A * | 9/1995 | Pophillat | 398/76 |
| 5,596,667 | A | 1/1997 | Watanabe | |
| 6,341,026 | B1 * | 1/2002 | Watanabe | 398/150 |
| 7,058,313 | B2 * | 6/2006 | Shimizu et al. | 398/186 |
| 7,200,343 | B2 * | 4/2007 | Ikeuchi | 398/198 |
| 7,778,553 | B2 * | 8/2010 | Yuki et al. | 398/183 |
| 7,817,923 | B2 * | 10/2010 | Akiyama et al. | 398/188 |
| 2002/0167705 | A1 * | 11/2002 | Shimizu et al. | 359/180 |
| 2003/0002112 | A1 | 1/2003 | Hirano et al. | |
| 2004/0081470 | A1 | 4/2004 | Griffin | |
| 2007/0264028 | A1 * | 11/2007 | Yuki et al. | 398/183 |
| 2009/0041473 | A1 | 2/2009 | Nishihara et al. | |
| 2009/0245814 | A1 | 10/2009 | Griffin | |
| 2010/0054738 | A1 * | 3/2010 | Yuki | 398/65 |

FOREIGN PATENT DOCUMENTS

| | | |
|---|---|---|
| JP | 2004-516743 | 6/2004 |
| JP | 2007-329886 | 12/2007 |

OTHER PUBLICATIONS

U.S. Appl. No. 13/048,150, filed Mar. 15, 2011, Masato Nishihara et al., Fujitsu Limited.
U.S. Office Action mailed May 23, 2013 in related U.S. Appl. No. 13/048,150 (14 pages).
US Office Action mailed Feb. 19, 2013 in related copending U.S. Appl. No. 13/048,150 (5 pages).

* cited by examiner

*Primary Examiner* — Shi K Li
*Assistant Examiner* — Merlin Brito Peguero
(74) *Attorney, Agent, or Firm* — Staas & Halsey LLP

(57) ABSTRACT

An optical modulation apparatus includes a first modulator, a second modulator, a multiplexer, a detector and an adjustor. The first modulator modulates light emitted by a light source using a first input signal and outputs a first modulated signal. The second modulator modulates the light using a second input signal and outputs a second modulated signal. The multiplexer multiplexes the first and second modulated signals and outputs a multiplexed signal. The detector is configured to detect a dip where power in a waveform of the multiplexed signal is equal to or smaller than a predetermined value. The adjustor is configured to adjust a delay of the first and second input signals based on power at the dip.

12 Claims, 18 Drawing Sheets

WHEN REFERENCE VOLTAGE = 0

WHEN REFERENCE VOLTAGE = V1

WHEN REFERENCE VOLTAGE = V2

OPTICAL MODULATION APPARATUS AND OPTICAL MODULATION METHOD

CROSS-REFERENCE TO RELATED APPLICATIONS

This application is based upon and claims the benefit of priority of the prior Japanese Patent Application No. 2010-64530, filed on Mar. 19, 2010, the entire contents of which are incorporated herein by reference.

BACKGROUND

1. Field

Various embodiments described herein relate to optical modulation apparatuses and optical modulation methods.

2. Description of the Related Art

With an increase in transmission traffic, demand has been growing recently for introduction of a next-generation optical transmission system having a transmission capacity exceeding the existing 40 gigabit per second (Gbps). When signal transmission speed is simply increased for realization of the mass transmission capacity, realization of electric signal circuits to be used is difficult. For example, degradation of optical transmission signals, such as spectral degradation caused by optical filters and signal degradation caused by chromatic dispersion and optical noise accumulation, occurs. Accordingly, an optical transmission system adopting a multi-level phase modulation having good spectrum efficiency, optical signal-to-noise ratio (OSNR) tolerance, and non-linear tolerance seems to be promising. For example, quadrature phase-shift keying (QPSK) for four-level phase modulation is available as the multi-level phase modulation.

An optical modulation apparatus that includes a return-to-zero (RZ) modulator and adopts RZ differential QPSK (RZ-DQPSK) modulation is one type of QPSK optical modulation apparatuses. The RZ-DQPSK modulation is expected as a modulation candidate adopted in the next-generation optical transmission system because it characteristically has high spectrum efficiency and yields a modulated optical signal of a narrow spectrum.

The RZ-DQPSK optical modulation apparatus generally has an I-arm for superposing a data signal on an in-phase (I) component of light emitted by a light source and a Q-arm for superposing another data signal on a quadrature-phase (Q) component of the light emitted by the light source. The signals resulting from superposition of the data signals on the light at the I-arm and the Q-arm are multiplexed to be a DQPSK modulation signal. The RZ modulator then performs RZ modulation on the DQPSK modulation signal to yield an optical signal modulated according to RZ-DQPSK modulation.

At this time, the signals obtained at the I-arm and the Q-arm may be out of phase because of a temperature change or an aging change, for example. More specifically, a delay difference may occur between the I-component and the Q-component of the light to be multiplexed. The delay difference may impair the optical signal resulting from the RZ-DQPSK modulation. As a result, transmission performance decreases in optical transmission apparatuses for transmitting the optical signals.

To avoid such a circumstance, a technique is studied for monitoring power of an optical signal output from an RZ modulator and adjusting delays of data signals input to an I-arm and a Q-arm based on the monitoring result. FIG. 16 illustrates a configuration of such an optical modulation apparatus for adjusting the delays of the data signals. The optical modulation apparatus includes a laser diode (hereinafter, abbreviated as an "LD") 11 serving as a light source, a DQPSK modulator 12a, an RZ modulator 12b, drivers (hereinafter, abbreviated as "DRVs") 13a-13c, and phase shifters 14a-14c. The optical modulation apparatus also includes an optical coupler 21, a photo detector (hereinafter, abbreviated as a "PD") 22, a band-pass filter (hereinafter, abbreviated as a "BPF") 23, a power monitor (hereinafter, abbreviated as a "MON") 24, and a controller 30.

Light generated by the LD 11 is input to the DQPSK modulator 12a. An I-arm and a Q-arm of the DQPSK modulator 12a superpose data signals from the DRVs 13a and 13b on an I-component and a Q-component of the light, respectively. The I-component and the Q-component of the light having the data signals superposed thereon are multiplexed to be a DQPSK modulation signal. The RZ modulator 12b then performs RZ modulation on the DQPSK modulation signal. At this time, the RZ modulator 12b performs the RZ modulation on the DQPSK modulation signal using a clock signal CLK from the DRV 13c.

The optical coupler 21 splits the optical signal resulting from the RZ modulation. The PD 22 then converts the split optical signal into an electric signal. The electric signal passes through the BPF 23, whereby the MON 24 monitors power at a specific band of the electric signal. The controller 30 adjusts amounts of phase shift (hereinafter, referred to as phase-shift amounts) set in the phase shifters 14a and 14b in accordance with the monitoring result provided by the MON 24 to decrease a delay difference between the signals yielded at the I-arm and the Q-arm. At the same time, the controller 30 adjusts a phase-shift amount set in the phase shifter 14c in accordance with the monitoring result provided by the MON 24. As described above, the optical modulation apparatus monitors the power of the RZ-modulated signal and shifts the delays of the data signals in accordance with the monitoring result, thereby being able to decrease the delay difference between two signals to be multiplexed in multi-level phase modulation.

Japanese Unexamined Patent Application Publication No. 2007-329886 is an example of related art.

However, the method for monitoring the power of the signal and adjusting the delay difference in accordance with the monitoring result is based on an assumption that the RZ modulation is performed on the DQPSK modulation signal. An optical modulation apparatus without the RZ modulator unfortunately has difficulty appropriately controlling the delay difference. More specifically, an optical modulation apparatus adopting, for example, non return-to-zero DQPSK (NRZ-DQPSK) modulation does not perform RZ modulation on a DQPSK modulation signal. Accordingly, such an optical modulation apparatus has difficulty appropriately controlling a delay difference even if it monitors power of the signal.

To concretely explain this problem, FIG. 17 illustrates a signal waveform resulting from NRZ-DQPSK modulation and RZ-DQPSK modulation for each delay difference. More specifically, FIG. 17 illustrates waveforms of optical signals resulting from the NRZ-DQPSK modulation and the RZ-DQPSK modulation when the delay difference is 0 picoseconds (ps), 4 ps, and 8 ps. In each graph of FIG. 17, the horizontal axis represents time, whereas the vertical axis represents power.

As illustrated in FIG. 17, signal information at an area "A" illustrated in the drawing is extracted from the optical signal resulting from the RZ-DQPSK modulation through pulse carving of the RZ modulator. Accordingly, the MON 24 illustrated in FIG. 16 monitors power of the signal at the area "A" illustrated in FIG. 17. Since the power of the signal at the area "A" illustrated in FIG. 17 decreases as the delay difference increase, the controller 30 illustrated in FIG. 16 sets the phase-shift amounts so that a maximum value is monitored. In this way, the delay difference can be decreased.

In contrast, pulse carving is not performed by the RZ modulator on the optical signal resulting from the NRZ-DQPSK modulation. Accordingly, an average of the power of the optical signal of the whole area illustrated in each graph of FIG. 17 is monitored. As a result, since the monitored signal power does not change even if the delay difference changes, the monitoring result does not reflect the delay difference.

That is, as illustrated in FIG. 18, the monitored output decreases as the delay difference increases regarding the RZ-DQPSK modulation. In contrast, regarding the NRZ-DQPSK modulation, the monitored output is substantially constant even if the delay difference increases. Thus, monitoring the power of the non-RZ-modulation signal is not useful in appropriately controlling the delay difference between the two signals multiplexed by the DQPSK modulator. Since the delay difference is not appropriately controlled, the NRZ-DQPSK optical modulation apparatus unfortunately has difficulty suppressing degradation of the optical signal.

A similar problem occurs when, for example, polarization multiplexing is adopted in optical transmission. In the polarization multiplexing, data signals are superposed on different polarized components before the polarized components are multiplexed. A delay difference between the polarized components to be multiplexed degrades the multiplexed optical signal. Since the delay difference between the polarized components is not reflected in power of the multiplexed optical signal, it is difficult to suppress degradation of the optical signal by monitoring the power of the optical signal.

SUMMARY

In view of such problems, according to an aspect of an embodiment of the present invention a technology is disclosed to provide optical modulation apparatuses and optical modulation methods capable of appropriately controlling a delay difference between a plurality of signal components to be multiplexed and of suppressing degradation of an optical signal resulting from multiplexing of the plurality of signal components.

An optical modulation apparatus includes a first modulator, a second modulator, a multiplexer, a detector and an adjustor. The first modulator modulates light emitted by a light source using a first input signal and outputs a first modulated signal. The second modulator modulates the light using a second input signal and outputs a second modulated signal. The multiplexer multiplexes the first and second modulated signals and outputs a multiplexed signal. The detector is configured to detect a dip where power in a waveform of the multiplexed signal is equal to or smaller than a predetermined value. The adjustor is configured to adjust a delay of the first and second input signals based on power at the dip.

The object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
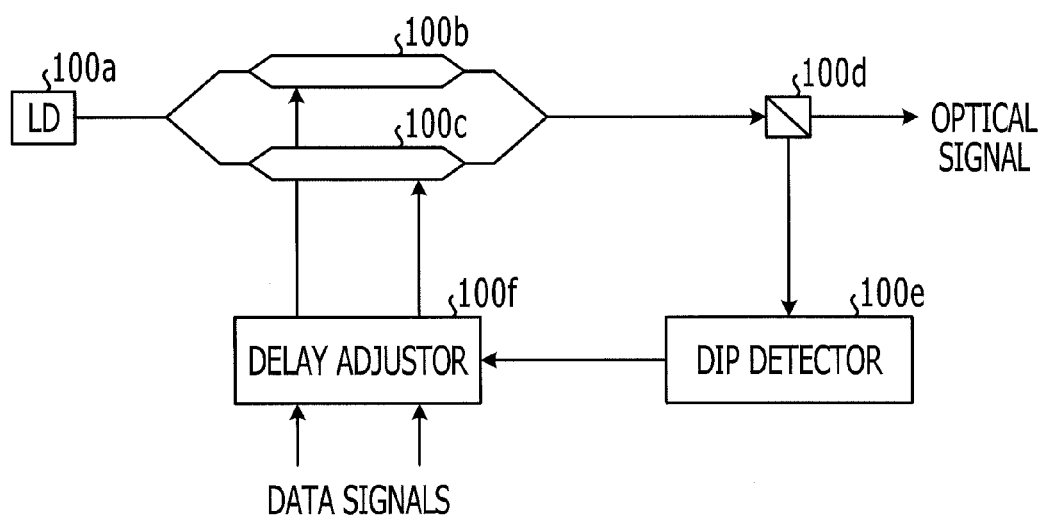
FIG. 1 is a block diagram illustrating a configuration of an optical modulation apparatus according to a first embodiment.

Reference will now be made in detail to the embodiments, examples of which are illustrated in the accompanying drawings, wherein like reference numerals refer to the like elements throughout.

Hereinafter, embodiments of optical modulation apparatuses and optical modulation methods disclosed in this application will be described in detail with reference to the accompanying drawings. It should be noted that the embodiments do not limit this invention.

First Embodiment

FIG. 1 is a block diagram illustrating a configuration of an optical modulation apparatus according to a first embodiment. The optical modulation apparatus illustrated in FIG. 1 includes an LD 100a, a first modulator 100b, a second modulator 100c, an optical coupler 100d, a dip detector 100e, and a delay adjustor 100f.

The LD 100a serving as a light source emits light of a predetermined wavelength. The first modulator 100b superposes a data signal on a first component of the light emitted from the LD 100a, whereas the second modulator 100c superposes another data signal on a second component of the light emitted from the LD 100a. When the first modulator 100b and the second modulator 100c are included in a DQPSK modulator for performing DQPSK modulation on data signals, an I-component and a Q-component of light, for example, correspond to the first component and the second component of the light, respectively. The first and second components of the light having the data signals superposed by the first and second modulators 100b and 100c, respectively, are multiplexed to be a multi-level phase modulation signal. The optical coupler 100d splits the multi-level phase modulation signal. The optical coupler 100d then outputs one of the split signals as an optical signal and the other signal to the dip detector 100e.

The dip detector 100e detects a dip where the minimum power is observed in a waveform of the signal output from the optical coupler 100d. More specifically, the dip detector 100e detects, as a dip, a time area where the power falls below a predetermined value determined from, for example, an average power value in the signal waveform. The dip detector 100e then notifies the delay adjustor 100f of an index value indicating how much the power falls at the detected dip compared with power in another area of the signal waveform. More specifically, the dip detector 100e outputs to the delay adjustor 100f an index value regarding depth of the dip indicating how much the power falls at the dip.

Figure 2:
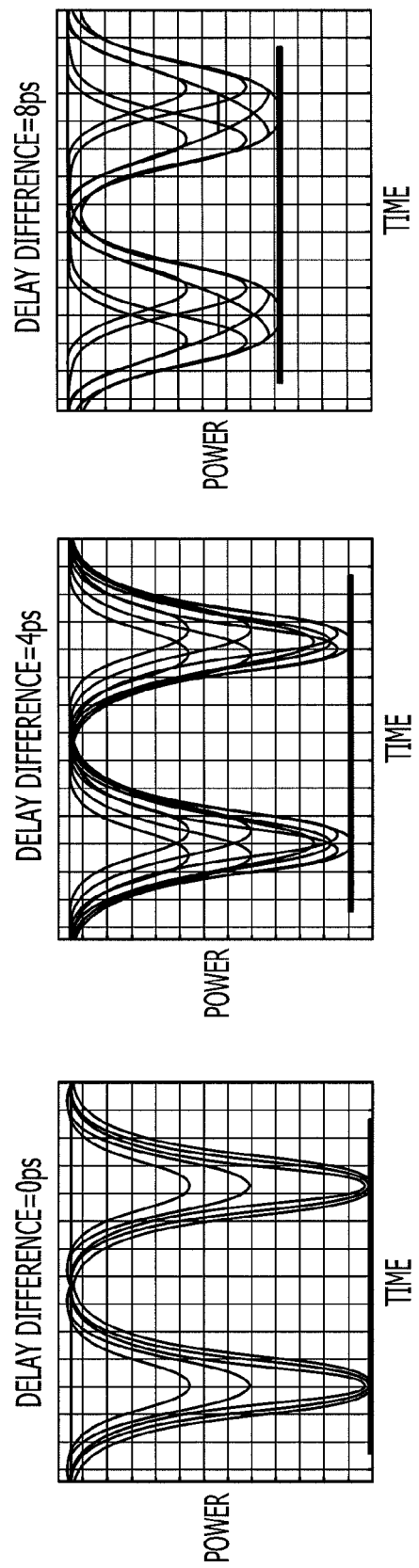
FIG. 2 is a diagram illustrating a specific example of a signal waveform for each delay difference.

A relation between the dip of the multi-level phase modulation signal and a delay difference of the two signals modulated by the first modulator 100b and the second modulator 100c will now be described with reference to FIG. 2. FIG. 2 illustrates waveforms of the multi-level phase modulation signals when the delay difference is 0 ps, 4 ps, and 8 ps.

As illustrated in FIG. 2, each signal waveform has two dips. The dip is deeper and power at the dip is smaller when the delay difference is 0 ps than when the delay difference is 4 ps and 8 ps. As the delay difference increases, the dip shallows and the power at the dip increases. Accordingly, the delay difference approaches 0 ps by setting the power at the dip to be the smallest value. Information of the data signals is not superposed at the two dips but is superposed between the dips in each signal waveform.

The dip detector 100e notifies the delay adjustor 100f of the index value indicating the depth of the dip that changes depending on the delay difference in the foregoing manner. The delay adjustor 100f adjusts delays of the signals input to the first modulator 100b and the second modulator 100c so that the power at the dip detected by the dip detector 100e decreases.

An optical modulation method of the optical modulation apparatus having the foregoing configuration will now be described.

The first modulator 100b and the second modulator 100c superpose data signals on a first component and a second component of light emitted by the LD 100a. The first component and the second component are multiplexed to be a multi-level phase modulation signal of the data signals. The optical coupler 100d splits the multi-level phase modulation signal and inputs the split signal to the dip detector 100e.

Upon receiving the multi-level phase modulation signal, the dip detector 100e detects a dip in a waveform of the signal and outputs an index value indicating depth of the detected dip to the delay adjustor 100f. Power at the detected dip is small when the two signals output from the first modulator 100b and the second modulator 100c are in phase, whereas the power increases as a delay difference of the two signals increases. That is, the larger the delay difference between the two signals multiplexed in the multi-level phase modulation, the larger the power at the dip and the shallower the dip.

The delay adjustor 100f adjusts delays of the signals input to the first modulator 100b and the second modulator 100c so that the power at the dip detected by the dip detector 100e decreases. The delays are adjusted so that the power at the dip detected by the dip detector 100e becomes the minimum value. Since the delay difference between the two signals output from the first modulator 100b and the second modulator 100c is solved, degradation of an optical signal can be suppressed.

As described above, in accordance with this embodiment, a dip is detected in a modulation signal having data signals superposed thereon by the first modulator and the second modulator. Delays of the signals input to the first modulator and the second modulator are adjusted so that power at the detected dip decreases. Accordingly, even if RZ modulation is not performed on the multi-level phase modulation signal, a delay difference between the signals multiplexed in the multi-level phase modulation is appropriately controlled and degradation of an optical signal can be suppressed.

Second Embodiment

Figure 3:
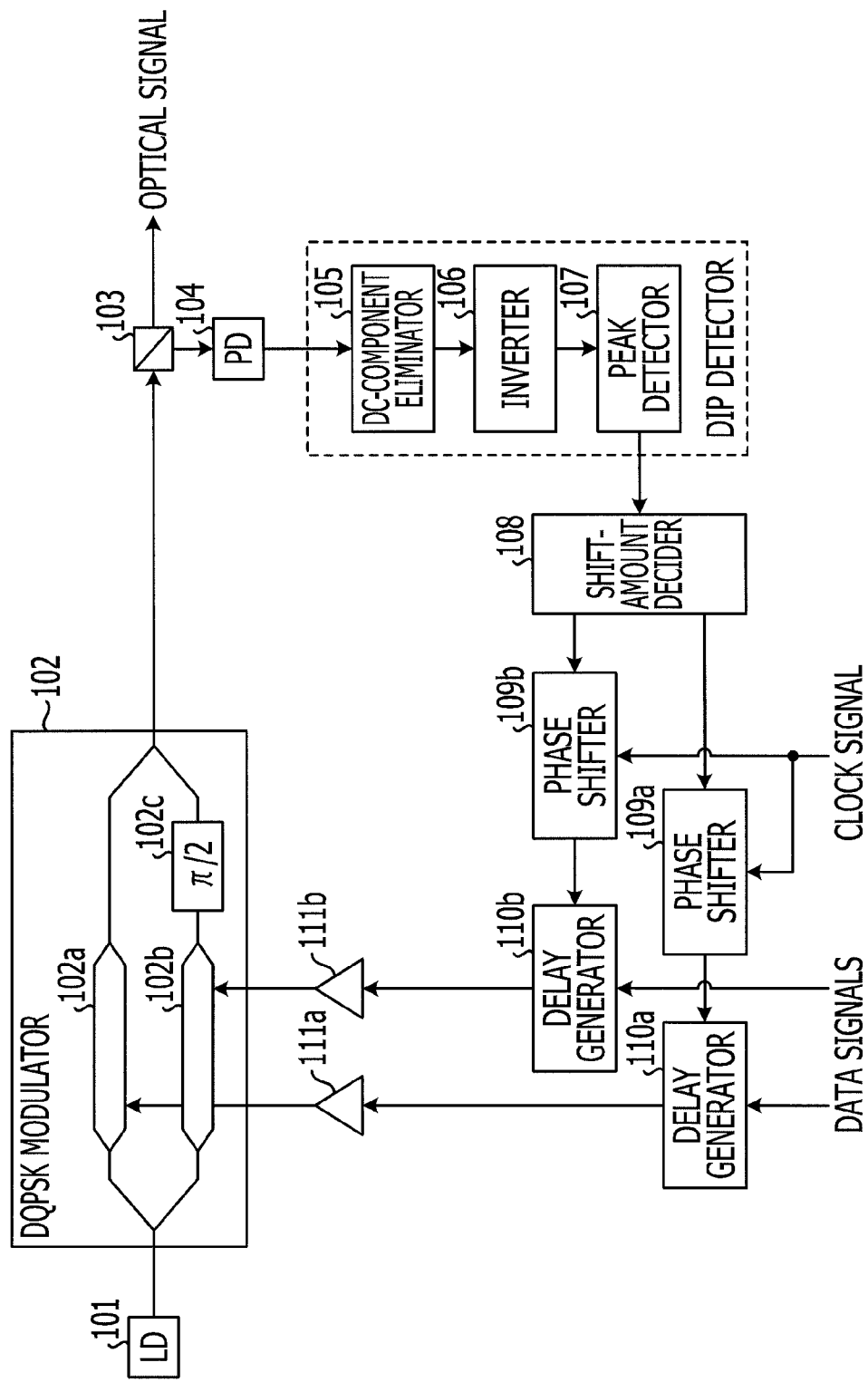
FIG. 3 is a block diagram illustrating a configuration of an optical modulation apparatus according to a second embodiment.

FIG. 3 is a block diagram illustrating a configuration of an optical modulation apparatus according to a second embodiment. The optical modulation apparatus illustrated in FIG. 3 includes an LD 101, a DQPSK modulator 102, an optical coupler 103, a PD 104, a direct-current-component (DC-component) eliminator 105, an inverter 106, and a peak detector 107. The optical modulation apparatus illustrated in FIG. 3 also includes a shift-amount decider 108, phase shifters 109a and 109b, delay generators 110a and 110b, and DRVs 111a and 111b. The DQPSK modulator 102 includes an I-arm modulator 102a, a Q-arm modulator 102b, and a phase shifter 102c. The DC-component eliminator 105, the inverter 106, and the peak detector 107 is included in a dip detector according to this embodiment.

The LD 101 serving as a light source emits light of a predetermined wavelength. The DQPSK modulator 102 including, for example, a Mach-Zehnder interferometer, performs quadrature phase shift keying. More specifically, the I-arm modulator 102a superposes a data signal output from the DRV 111a on the light to perform binary phase shift keying, whereas the Q-arm modulator 102b superposes a data signal output from the DRV 111b on the light to perform binary phase shift keying. The phase shifter 102c shifts a phase of the signal resulting from the phase modulation by the Q-arm modulator 102b by Π/2. The signal output from the I-arm modulator 102a and the signal output from the phase shifter 102c are multiplexed to be a DQPSK modulation signal. Hereinafter, an arm including the I-arm modulator 102a is referred to as an I-arm, whereas an arm including the Q-arm modulator 102b and the phase shifter 102c is referred to as a Q-arm.

The I-arm and Q-arm signals multiplexed by the DQPSK modulator 102 may have a delay difference. The delay difference is caused by, for example, an error, a temperature change, or an aging change at the time of manufacturing of the optical modulation apparatus. The delay difference between the signals at the corresponding arms multiplexed by the DQPSK modulator 102 degrades the DQPSK modulation signal and, thus, transmission performance at the time of transmission of the DQPSK modulation signal. The delay difference between the signals at the corresponding arms also alters power at a dip of the DQPSK modulation signal. More specifically, the larger the delay difference, the larger the power at the dip and the shallower the dip.

The optical coupler 103 splits the DQPSK modulation signal. The optical coupler 103 outputs one of the split signals as an optical signal and the other signal to the PD 104. The PD 104 converts the optical signal output from the optical coupler 103 into an electric signal.

The DC-component eliminator 105 eliminates a DC component of the electric signal yielded by the PD 104. The inverter 106 inverts a waveform of the DC-component eliminated signal. More specifically, the inverter 106 converts a dip in power in the waveform of the multi-level phase modulation signal into a waveform having a peak in power. The peak detector 107 detects a peak in power from the signal waveform output from the inverter 106 and notifies the shift-amount decider 108 of the power at the detected peak.

Figure 4:
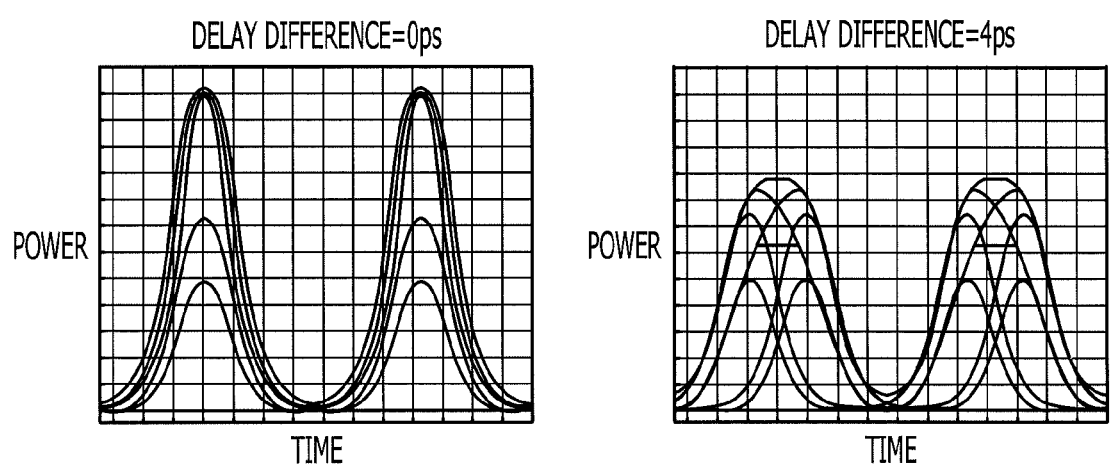
FIG. 4 is a diagram illustrating specific examples of inverted signal waveforms.

The inverter 106 converts the waveform of the multi-level phase modulation signal into, for example, ones illustrated in FIG. 4. FIG. 4 illustrates inverted signal waveforms when a delay difference between the I-arm and the Q-arm is 0 ps and 4 ps. As illustrated in FIG. 4, height of a peak for the delay difference of 0 ps differs from that of a peak for the delay difference of 4 ps. More specifically, as described above, the power at the dip increases and the dip shallows as the delay difference between the signals at the corresponding arms increases in the non-inverted signal waveform. Accordingly, the peak lowers as the delay difference increases in the inverted signal waveform. By adjusting delays of the signals input to the DQPSK modulator 102 so that the power at the peak detected by the peak detector 107 increases, the delay difference between the corresponding arms can be set closer to 0.

Based on the power at the peak detected by the peak detector 107, the shift-amount decider 108 decides phase-shift amounts to be generated in a clock signal by the phase shifters 109a and 109b. That is, the shift-amount decider 108 changes the phase-shift amounts of the clock signal, thereby changing the delays of the data signals input to the DQPSK modulator 102. At this time, the shift-amount decider 108 changes the phase-shift amounts so that the power at the peak detected by the peak detector 107 increases and then notifies the phase shifters 109a and 109b of the respective changed phase-shift amounts.

Figure 5:
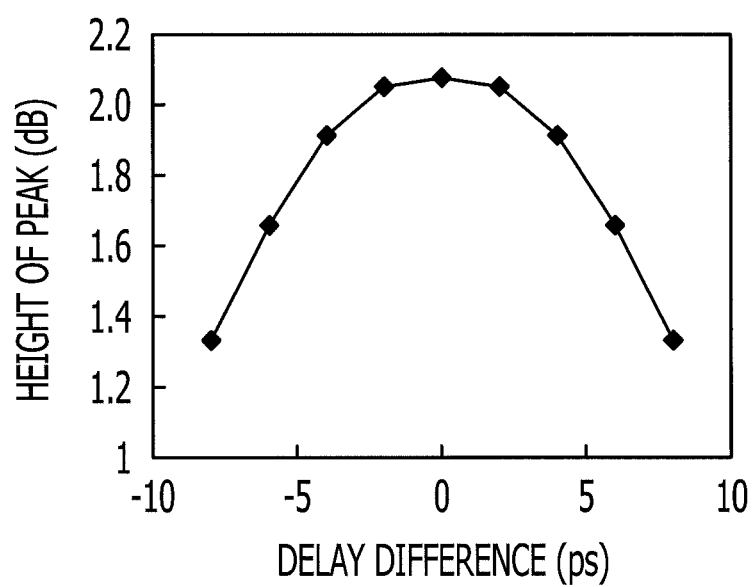
FIG. 5 is a diagram describing delay-difference control by a shift-amount decider.

More specifically, the height of the peak detected by the peak detector 107 changes depending on the delay difference as illustrated in FIG. 5; the highest peak is observed when the delay difference is 0 ps. Referring to FIG. 5, when the delay difference is large, the height of the peak greatly changes in response to a slight change of the delay difference. In contrast, when the delay difference is close to 0, the height of the peak does not change much. Accordingly, the shift-amount decider 108 compares the power at the peak detected by the peak detector 107 the last time with that at the peak detected this time. The shift-amount decider 108 determines whether the delay difference is approaching 0 before changing the phase-shift amounts of the clock signal.

At this time, the shift-amount decider 108 changes the phase-shift amounts by a predetermined value and determines whether the power at the peak detected by the peak detector 107 increases. Upon determining that the power at the peak increases, the shift-amount decider 108 continuously changes the phase-shift amounts by the predetermined value. If the power at the peak decreases, the shift-amount decider 108 determines that the delay difference is controlled in the opposite direction and reverses the direction of changing the phase-shift amounts.

More specifically, the shift-amount decider 108 sets the phase-shift amount set in the phase shifter 109a larger than that set in the phase shifter 109b by the predetermined value, for example. When the power at the peak decreases as a result, the shift-amount decider 108 relatively decreases the phase-shift amount set in the phase shifter 109a. In this way, the shift-amount decider 108 changes the phase-shift amounts of the clock signal until a change between the previously detected peak power and the peak power detected this time is smaller than a predetermined threshold, thereby changing the delays of the data signals input to the DQPSK modulator 102.

Each of the phase shifters 109a and 109b shifts the phase of the clock signal by the amount decided by the shift-amount decider 108. More specifically, the phase shifters 109a and 109b, supplied with the same in-phase clock signal, individually shift the phase of the clock signal based on the decision of the shift-amount decider 108.

The delay generators 110a and 110b delay the data signals in accordance with the clock signals whose phases are shifted by the phase shifters 109a and 109b, respectively. More specifically, the delay generators 110a and 110b delay different data signals based on the clock signals having different phases and output the data signals at different timings. If the optimum phase-shift amounts are decided by the shift-amount decider 108, the delay generators 110a and 110b output the data signals after delaying the data signals so that delays caused in the DRVs 111a and 111b and waveguides in the DQPSK modulator 102 are canceled.

The DRVs 111a and 111b output the data signals delayed by the delay generators 110a and 110b to the I-arm modulator 102a and the Q-arm modulator 102b of the DQPSK modulator 102, respectively. At this time, the DRVs 111a and 111b might generate different delays in the data signals because of a manufacturing error, for example. However, in this embodiment, the delay generators 110a and 110b delay in advance the data signals by optimum amounts decided in consideration of the delay difference caused by the delays of the DRVs 111a and 111b, respectively.

Figure 6:
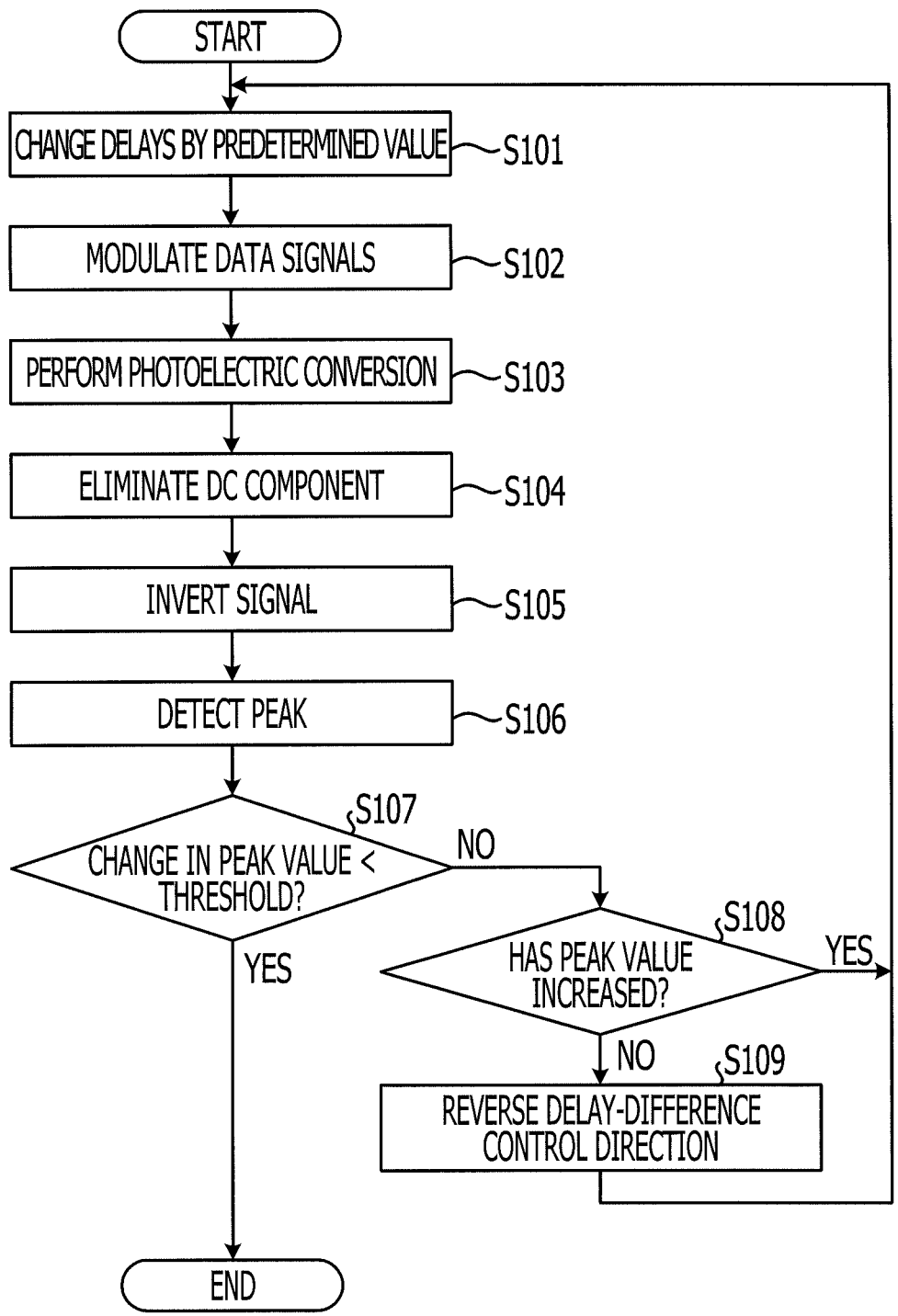
FIG. 6 is a flowchart illustrating a method for controlling a delay difference according to the second embodiment.

A delay-difference control method of the optical modulation apparatus having the foregoing configuration will now be described with reference to a flowchart illustrated in FIG. 6. FIG. 6 describes an operation performed when a change between power at a peak detected by the peak detector 107 the last time and power at a peak detected this time is equal to or larger than a predetermined threshold. If the power change is smaller than the predetermined threshold, delay-difference control is not needed because optimum phase-shift amounts are already decided by the shift-amount decider 108 and a delay difference between two signals at the corresponding arms of the DQPSK modulator 102 is close to 0.

If the change between the power at the previous peak and the power at this peak is equal to or larger than the predetermined threshold, the shift-amount decider 108 changes phase-shift amounts set in the phase shifters 109a and 109b, thereby changing delays generated in the data signals by a predetermined value (S101). More specifically, the shift-amount decider 108 changes a difference between the phase-shift amounts set in the phase shifters 109a and 109b, thereby changing a difference between the delays generated in the data signals by the delay generators 110a and 110b by a predetermined amount, respectively. At this time, the shift-amount decider 108 stores the power at the peak detected by the peak detector 107.

Upon receiving the data signals, the delay generators 110a and 110b generate in the data signals the delays changed by the predetermined values and then output the delayed data signals to the DRVs 111a and 111b, respectively. The DRVs 111a and 111b output the data signals to the I-arm modulator 102a and the Q-arm modulator 102b of the DQPSK modulator 102, where DQPSK modulation is executed (S102). After the data signals are superposed on the light emitted from the LD 101, the phase shifter 102c shifts a phase of the light having the data signal superposed thereon by the Q-arm modulator 102b by Π/2. In this way, an I-component of an optical signal is generated at the I-arm modulator 102a, whereas a Q-component of the optical signal is generated at the Q-arm modulator 102b and the phase shifter 102c. The I-component and the Q-component are multiplexed in the DQPSK modulator 102 to be a DQPSK modulation signal.

The optical coupler 103 splits the DQPSK modulation signal and outputs one of the split signals as an optical signal. This optical signal is transmitted after predetermined transmission processing, for example, is performed thereon. The other signal is output to the PD 104. The PD 104 converts the optical signal into an electric signal (S103). The DC-component eliminator 105 eliminates a DC component from the resulting electric signal (S104) and inputs the signal to the inverter 106. The inverter 106 inverts a waveform of the signal (S105). In this way, a dip of the waveform of the DQPSK modulation signal is converted into a peak.

As described above, the delay difference at the corresponding arms of the DQPSK modulation signal approaches 0 as the dip of the waveform of the DQPSK modulation signal deepens. Accordingly, the delay difference approaches 0 as height of the peak of the inverted signal waveform increases. To decrease the delay difference using this characteristic, the peak detector 107 detects a peak of the inverted signal waveform (S106). The shift-amount decider 108 is notified of power at the peak detected by the peak detector 107. The notified peak power corresponds to depth of a dip of the DQPSK modulation signal; the larger the power at the peak, the deeper the dip of the DQPSK modulation signal.

The shift-amount decider 108 determines whether a change between the power at the peak notified by the peak detector 107 this time and the power at the peak previously notified is smaller than a predetermined threshold (S107). More specifically, the shift-amount decider 108 determines a difference between the stored power at the previous peak and the power at this peak. The shift-amount decider 108 then determines whether the difference is smaller than the predetermined threshold. If the change in the power is smaller than the predetermined threshold (YES in S107), the shift-amount decider 108 determines that the delay difference is sufficiently small and is close to 0 and terminates the delay-difference control.

That is, as already described with reference to FIG. 5, when the delay difference between the signals of the corresponding arms of the DQPSK modulator 102 is controlled by adjusting the delays of the data signals, the change in the peak power differs depending on whether the delay difference is close to 0 or not. More specifically, when the delay difference is close to 0 and the change in the delay difference is small, the peak power does not change much. In contrast, when the delay difference is large, the peak power greatly changes even for a slight change of the delay difference. Accordingly, when the change between the power at the previous peak and the power at this peak is smaller than the predetermined threshold, the shift-amount decider 108 determines that the delay difference is close to 0.

After the delay difference control, the phase-shift amounts currently set in the phase shifters 109a and 109b are continuously set as optimum phase-shift amounts. In this way, the delay generators 110a and 110b generate the optimum delays in the data signals input to the DQPSK modulator 102 and the delay difference between the two signals at the corresponding arms of the DQPSK modulator 102 becomes sufficiently small.

If the change in the peak power is equal to or larger than the predetermined threshold (NO in S107), the shift-amount decider 108 determines whether the power at this peak has increased from the previous one (S108). If the power has increased from the previous one (YES in S108), the shift-amount decider 108 changes the delays of the data signals by the predetermined value just like the last time (S101) because it is considered that the delay difference is controlled in an intended direction and the delay difference is approaching 0. More specifically, for example, when the phase-shift amount set in the phase shifter 109a is increased in the previous delay-amount change, the shift-amount decider 108 sets a larger phase-shift amount in the phase shifter 109a this time. The method for changing the phase-shift amount does not have to be the same as the previous one. The delay difference of the data signals is at least changed in the same direction as the previous one by the predetermined value. For example, when the phase-shift amount set in the phase shifter 109a is increased in the previous delay-amount change as described above, the phase-shift amount set in the phase shifter 109b may be decreased this time.

If the power at the peak has decreased from the previous one (NO in S108), the shift-amount decider 108 reverses the delay-difference control direction because it is considered that the delay difference is controlled in an unintended direction (S109). After reversing the control direction, the shift-amount decider 108 changes the delays of the data signals by the predetermined value (S101). More specifically, when the phase-shift amount set in the phase shifter 109a is increased in the previous delay-amount change, a smaller phase-shift amount is set in the phase shifter 109a this time. In the method for changing the shift amount, the delay difference of the data signals is at least changed in the direction opposite to the previous one by the predetermined value. For example, just like the foregoing example, when the phase-shift amount set in the phase shifter 109a is increased in the previous delay-amount change, the phase-shift amount set in the phase shifter 109b may be increased this time.

If the change between the power at the previous peak and the power at this peak is smaller than the predetermined threshold after repetition of such a delay-difference control operation, the shift-amount decider 108 decides the phase-shift amounts that make the delay difference of the two signals at the corresponding arms of the DQPSK modulator 102 sufficiently small. If the decided phase-shift amounts are set in the phase shifters 109a and 109b, the delay generators 110a and 110b adjust the delays of the data signals and the delay difference between the two signals at the corresponding arms of the DQPSK modulator 102 becomes sufficiently small. In this way, degradation of the DQPSK modulation signal is suppressed and a decrease in transmission performance of an optical transmission apparatus for transmitting optical signals is suppressed.

Figure 7:
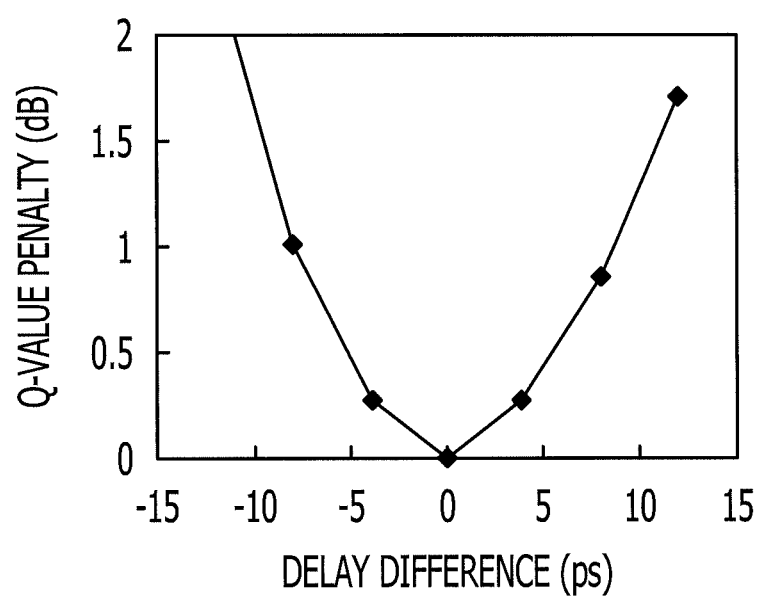
FIG. 7 is a diagram illustrating a specific example of a relation between a delay difference and transmission performance.

More specifically, for example, a relation illustrated in FIG. 7 is observed between the delay difference between the two signals at the corresponding arms of the DQPSK modulator 102 and the transmission performance of the optical transmission apparatus. More specifically, when the delay difference is 0 ps, Q-value penalty indicating the decrease in the transmission performance is also 0 dB. In contrast, when the delay difference is about 8 ps or −8 ps, for example, the Q-value penalty is about 1 dB. Accordingly, decreasing the delay difference of about 8 ps to 0 ps can improve the transmission performance by about 1 dB.

As described above, in accordance with this embodiment, a waveform of a DQPSK modulation signal resulting from DQPSK modulation of data signals is inverted and then a peak is detected. Delays of the data signals input to the DQPSK modulator are adjusted so that the maximum power is observed at the peak. Accordingly, optimum delays decided in consideration of an error and/or a temperature change at the time of manufacturing of the apparatus can be generated in the two signals input to the DQPSK modulator, the delay difference between the two signals at the corresponding arms of the DQPSK modulator can be made sufficiently small, and degradation of an optical signal can be suppressed. That is, even if RZ modulation is not performed on the DQPSK modulation signal, degradation of the optical signal can be suppressed by appropriately controlling the delay difference between the signals multiplexed in multi-level phase modulation.

Third Embodiment

In a third embodiment, a dip in a waveform of a signal is detected based on comparison of signal power with reference voltage and delays of data signals are adjusted in accordance with the reference voltage corresponding to depth of the dip.

Figure 8:
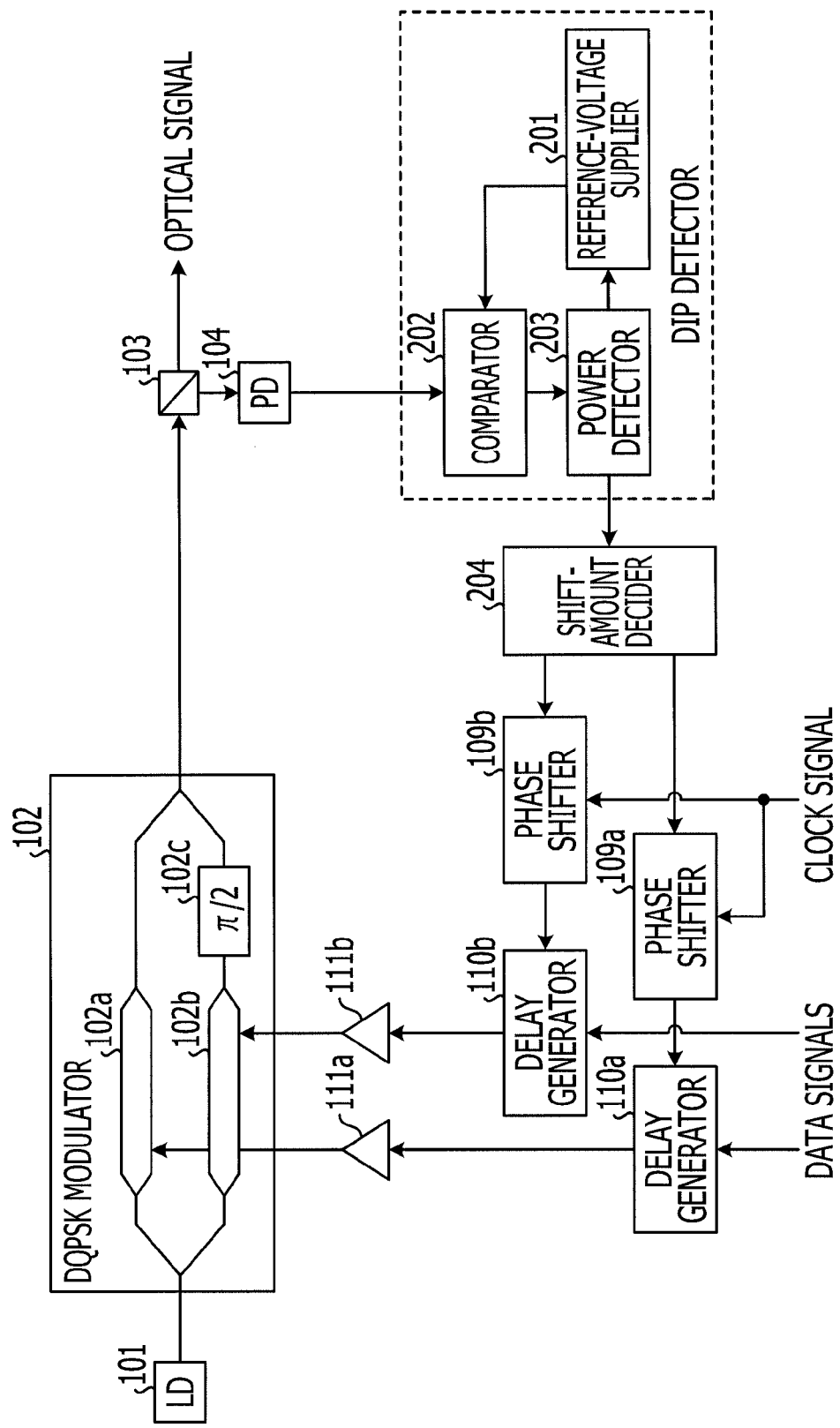
FIG. 8 is a block diagram illustrating a configuration of an optical modulation apparatus according to a third embodiment.

FIG. 8 is a block diagram illustrating a configuration of an optical modulation apparatus according to this embodiment. In FIG. 8, like reference characters designate the same or similar components illustrated in FIG. 3 to omit a description thereof. The optical modulation apparatus illustrated in FIG. 8 includes a shift-amount decider 204 instead of the shift-amount decider 108 illustrated in FIG. 3 and a dip detector having an internal configuration different from the one illustrated in FIG. 3. More specifically, the dip detector according to this embodiment includes a reference-voltage supplier 201, a comparator 202, and a power detector 203.

The reference-voltage supplier 201 sets reference voltage to a predetermined initial value, such as 0, in an initial state before supplying the reference voltage to the comparator 202. Upon receiving an instruction for raising the reference voltage from the power detector 203, the reference-voltage supplier 201 raises the reference voltage before supplying the reference voltage to the comparator 202.

The comparator 202 compares power of a signal output from a PD 104 with the reference voltage supplied from the reference-voltage supplier 201 and outputs the comparison result to the power detector 203. More specifically, the comparator 202 includes, for example, a logic circuit and a digital flip flop. The comparator 202 outputs a value "1" if the signal power is equal to or larger than the reference voltage, whereas the comparator 202 outputs a value "0" if the signal power is smaller than the reference voltage.

Figure 9:
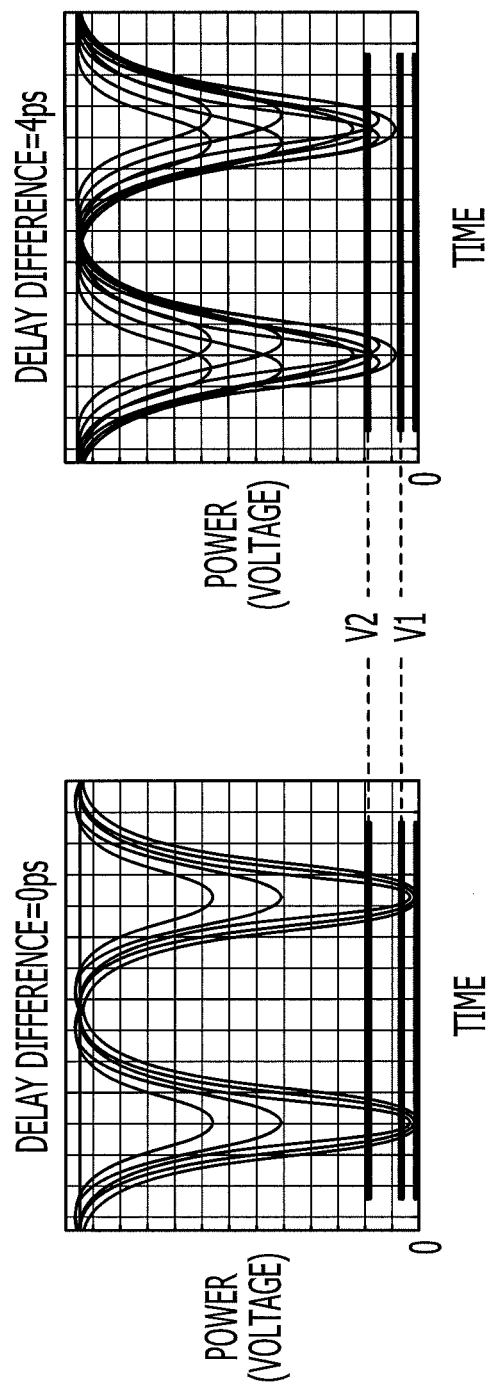
FIG. 9 is a diagram illustrating specific examples of waveforms input to a comparator.

A specific example of the comparison of the signal power with the reference voltage by the comparator 202 will now be described. FIG. 9 is a diagram illustrating waveforms of signals input to the comparator 202 when a delay difference between signals at corresponding arms of a DQPSK modulator 102 is 0 ps and 4 ps.

Figure 10A:
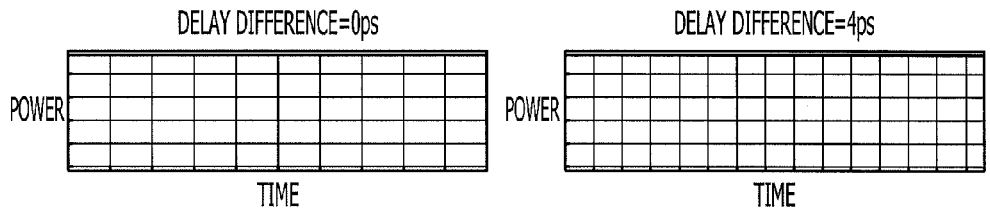
FIGS. 10A-10C are diagrams illustrating specific examples of waveforms output from the comparator.

When the reference voltage supplied from the reference-voltage supplier 201 is the initial value, such as 0, the signal power is equal to or larger than the reference voltage in the waveforms for the delay differences equal to 0 ps and 4 ps as illustrated in FIG. 9. Accordingly, as illustrated in FIG. 10A, the comparator 202 outputs the value "1" for the entire area of the input signal (sample input signal) when the delay difference is 0 ps and 4 ps.

Figure 10B:
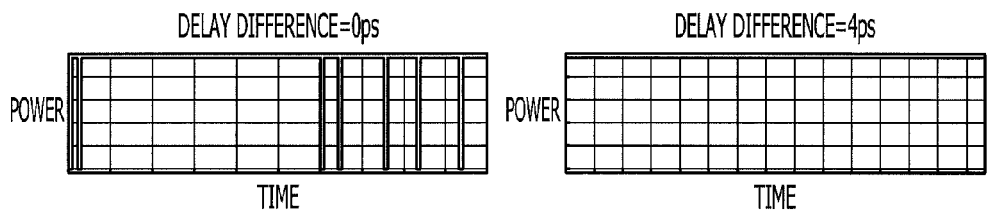

If the reference voltage supplied from the reference-voltage supplier 201 rises to, for example, V1 illustrated in FIG. 9, the signal power at the dip of the waveform is smaller than the reference voltage when the delay difference is 0 ps. In contrast, when the delay difference is 4 ps, the signal power at the dip of the waveform is equal to or larger than the reference voltage. Accordingly, as illustrated in FIG. 10B, the comparator 202 outputs the value "0" for part of the area of the input signal when the delay difference is 0 ps. When the delay difference is 4 ps, the comparator 202 outputs the value "1" for the entire area of the input signal.

Figure 10C:
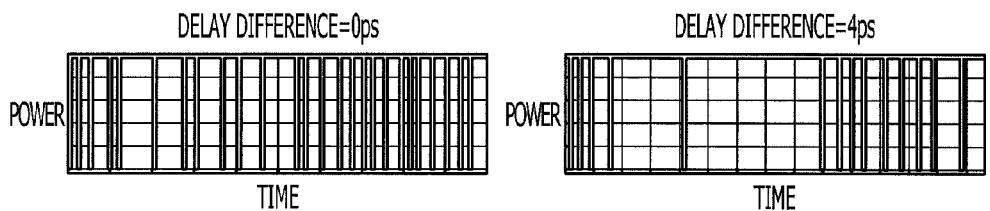

The reference voltage supplied from the reference-voltage supplier 201 further rises to, for example, V2 illustrated in FIG. 9, the signal power at the dip of the waveform is smaller than the reference voltage when the delay difference is 0 ps and 4 ps. However, an area for the delay difference of 0 ps where the signal power is smaller than the reference voltage is longer than that for the delay difference of 4 ps. Accordingly, the comparator 202 outputs the value "0" for part of the area of the input signal when the delay difference is 0 ps and 4 ps as illustrated in FIG. 10C. A total amount of the area where the value "0" is output is longer when the delay difference is 0 ps than when the delay difference is 4 ps.

Gradually raising the reference voltage in this manner changes the output of the comparator 202. The change in the output reflects the depth at the dip of the DQPSK modulation signal. More specifically, when the dip of the DQPSK modulation signal is deep, the comparator 202 outputs the value 0 at a small reference voltage. When the reference voltage is constant, the comparator 202 outputs the value "0" longer as the delay difference is closer to 0. Accordingly, average power of the output of the comparator 202 decreases as the delay difference approaches 0.

The power detector 203 detects the power output by the comparator 202 and determines an average of the detected output power. The power detector 203 compares the average power with a predetermined threshold. If the average power is equal to or larger than the predetermined threshold, the power detector 203 instructs the reference-voltage supplier 201 to raise the reference voltage. At this time, the power detector 203 stores the reference-voltage value that the reference-voltage supplier 201 supplies to the comparator 202 in accordance with the instruction. The power detector 203 also notifies the shift-amount decider 204 of the reference voltage currently supplied to the comparator 202 from the reference-voltage supplier 201 if the average output power is smaller than the predetermined threshold. The reference voltage notified by the power detector 203 corresponds to voltage for yielding the signal power at the dip of the signal input to the comparator 202 and reflects the signal power at the dip.

The shift-amount decider 204 decides phase-shift amounts of a clock signal generated in phase shifters 109a and 109b based on the reference voltage notified by the power detector 203. More specifically, the shift-amount decider 204 changes the phase-shift amounts of the clock signal, thereby changing delays of the data signals input to the DQPSK modulator 102. At this time, the shift-amount decider 204 changes the phase-shift amounts so that the reference voltage notified by the power detector 203 lowers before notifying the phase shifters 109a and 109b of the changed phase-shift amounts.

More specifically, as described above, when the dip of the DQPSK modulation signal is deep, the comparator 202 outputs the value "0" at a smaller reference voltage and, thus, the average output power of the comparator 202 lowers. Accordingly, when the dip of the DQPSK modulation signal is deep, the average power of the comparator 202 becomes smaller than the predetermined threshold at a relatively small reference voltage and the shift-amount decider 204 is notified of the relatively small reference voltage by the power detector 203. Magnitude of the reference voltage that the shift-amount decider 204 is notified of changes depending on the delay difference. When the delay difference is large, the notified reference voltage greatly changes in response to a slight change of the delay difference. In contrast, when the delay difference is close to 0, the notified reference voltage does not change much. Accordingly, the shift-amount decider 204 compares the reference voltage previously notified by the power detector 203 with the reference voltage notified this time to determine whether the delay difference is approaching 0. The shift-amount decider 204 then changes the phase-shift amounts of the clock signal.

At this time, the shift-amount decider 204 changes the phase-shift amounts by a predetermined value and determines whether the reference voltage notified by the power detector 203 has lowered. If the reference voltage has lowered, the shift-amount decider 204 continuously changes the phase-shift amounts by the predetermined value. If the reference voltage has risen, the shift-amount decider 204 determines that the delay difference is controlled in an opposite direction and reverses the direction of changing the phase-shift amounts.

More specifically, for example, when the notified reference voltage has risen as a result of relatively increasing the phase-shift amount set in a phase shifter 109a, the shift-amount decider 204 relatively decreases the phase-shift amount set in the phase shifter 109a. In this way, the shift-amount decider 204 changes the phase-shift amounts of the clock signal until the change in the reference voltage notified by the power detector 203 becomes smaller than the predetermined threshold to change the delays of the data signals input to the DQPSK modulator 102.

Figure 11:
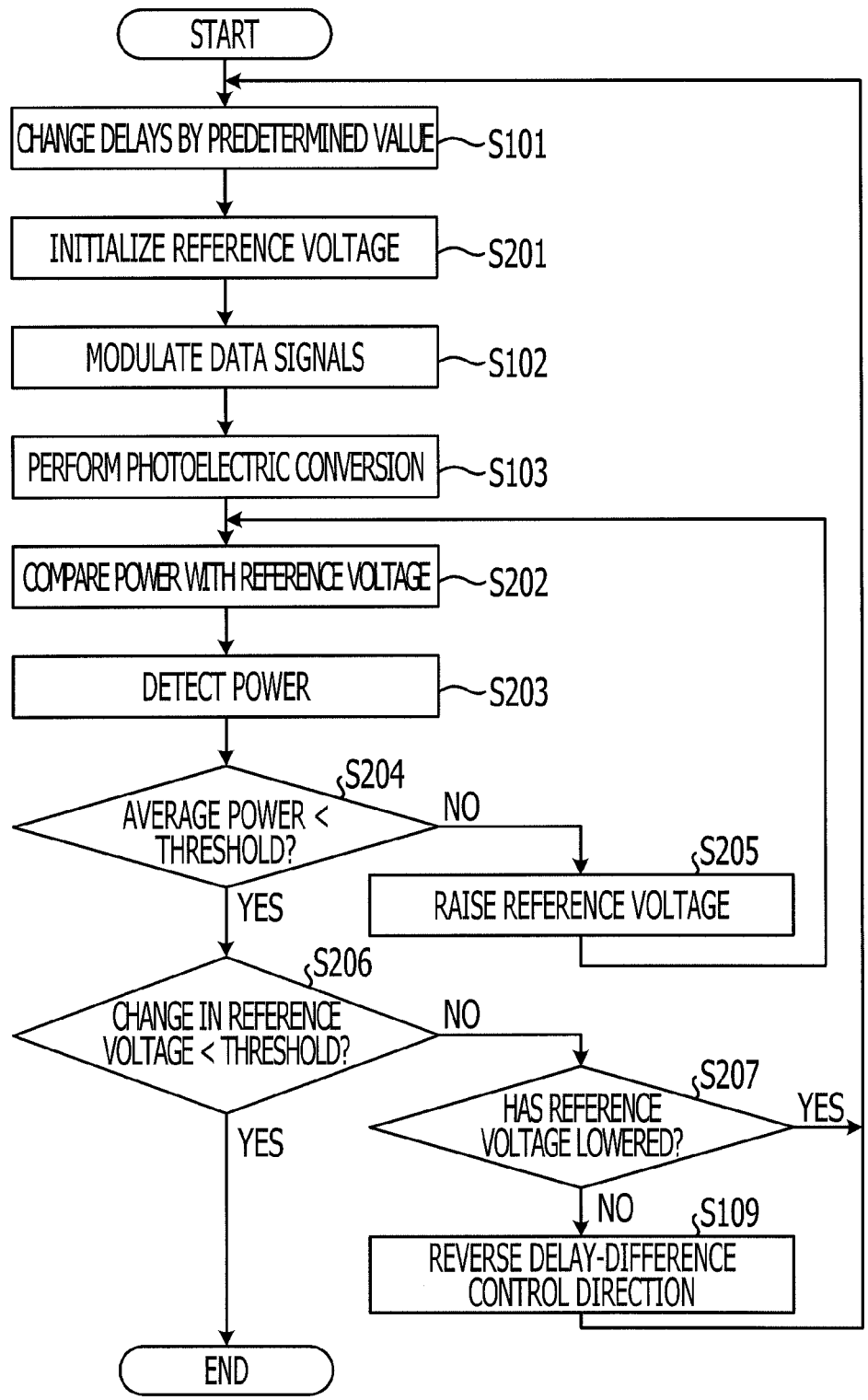
FIG. 11 is a flowchart illustrating a method for controlling a delay difference according to the third embodiment.

A delay-difference control method of the optical modulation apparatus having the foregoing configuration will now be described with reference to a flowchart illustrated in FIG. 11. In FIG. 11, like reference characters designate the same or similar operations illustrated in FIG. 6 to omit a detailed description thereof. FIG. 11 describes an operation performed when a change from reference voltage previously notified by the power detector 203 to reference voltage notified this time is equal to or larger than a predetermined threshold. When the change in the reference voltage is smaller than the predetermined threshold, the delay-difference control is not needed because optimum phase-shift amounts are already decided by the shift-amount decider 204 and a delay difference between two signals at the corresponding arms of the DQPSK modulator 102 is close to 0.

When the change between the previous reference voltage and this reference voltage is equal to or larger than the predetermined threshold, the shift-amount decider 204 changes phase-shift amounts set in the phase shifters 109a and 109b to change delays of the data signals by a predetermined value (S101). At this time, the shift-amount decider 204 stores the reference voltage notified by the power detector 203. Upon receiving the notification regarding the reference voltage from the power detector 203, the reference-voltage supplier 201 initializes the reference voltage to, for example, 0 (S201). More specifically, in this embodiment, every time a delay difference between signals at the corresponding arms of the DQPSK modulator 102 is controlled, the reference voltage is initialized and the reference voltage is decided that makes average output power of the comparator 202 smaller than the predetermined threshold.

Upon receiving the data signals, delay generators 110a and 110b generate in the data signals delays changed by the predetermined value before outputting the delayed data signals to DRVs 111a and 111b, respectively. The DRVs 111a and 111b output the data signals to an I-arm modulator 102a and a Q-arm modulator 102b of the DQPSK modulator 102, respectively, where DQPSK modulation is executed (S102).

An optical coupler 103 splits the DQPSK modulation signal resulting from DQPSK modulation and outputs one of the split signals as an optical signal. This optical signal is transmitted after predetermined transmission processing, for example, is performed thereon. The other signal is output to the PD 104. The PD 104 converts the optical signal into an electric signal (S103). The resulting electric signal is input to the comparator 202. The comparator 202 compares the signal power with the reference voltage supplied from the reference-voltage supplier 201 (S202). At an area where the signal power is equal to or larger than the reference voltage, the comparator 202 output the value "1" to the power detector 203. At an area where the signal power is smaller than the reference voltage, the comparator 202 outputs the value "0" to the power detector 203.

Upon receiving the output of the comparator 202, the power detector 203 detects the output power of the comparator 202 (S203) to determine average power of the entire area of the input signal (sample input signal). The power detector 203 then determines whether the average power is smaller than a predetermined threshold (S204). If the determination result indicates that the average power is equal to or larger than the predetermined threshold (NO in S204), the power detector 203 instructs the reference-voltage supplier 201 to raise the reference voltage and the reference voltage supplied from the reference-voltage supplier 201 rises (S205). More specifically, when the average power is equal to or larger than the predetermined threshold, the value "1" is output from the comparator 202 at many parts and the reference voltage has not reached the signal power at the dip. Accordingly, the reference-voltage supplier 201 raises the reference voltage.

The comparator 202 compares the raised reference voltage with the signal power again (S202). In this way, the reference voltage is raised until the average output power of the comparator 202 becomes smaller than the predetermined threshold. If the average power is smaller than the predetermined threshold (YES in S204), the power detector 203 notifies the shift-amount decider 204 of the current reference voltage.

The shift-amount decider 204 then determines whether the change between the reference voltage notified by the power detector 203 this time and the previously notified reference voltage is smaller than a predetermined threshold (S206). More specifically, the shift-amount decider 204 determines a difference between the stored reference voltage notified the last time and the reference voltage notified this time and then determines whether the difference is smaller than the predetermined threshold. If the change in the reference voltage is smaller than the predetermined threshold (YES in S206), the shift-amount decider 204 determines that the delay difference is sufficiently small and close to 0 and then terminates the delay-difference control operation.

After termination of the delay-difference control operation, the phase-shift amounts currently set in the phase shifters 109a and 109b are continuously set as optimum phase-shift amounts. In this way, optimum delays are generated in the data signals input to the DQPSK modulator 102 by the delay generators 110a and 110b and the delay difference between the two signals at the corresponding arms of the DQPSK modulator 102 is made sufficiently small.

If the change in the reference voltage notified by the power detector 203 is equal to or larger than the predetermined threshold (NO in S206), the shift-amount decider 204 determines whether the notified reference voltage has lowered from the previous one (S207). If the reference voltage has lowered from the previous one (YES in S207), the shift-amount decider 204 changes the delays of the data signals by the predetermined value just like the last time (S101) because it is considered that the delay difference is controlled in the intended direction and the delay difference is approaching 0.

If the reference voltage notified by the power detector 203 has risen from the previous one (NO in S207), the shift-amount decider 204 reverses the delay-difference control direction because it is considered that the delay difference is controlled in the unintended direction (S109). After reversing the control direction, the shift-amount decider 204 changes the delays of the data signals by the predetermined value (S101).

If the change in the reference voltage notified by the power detector 203 becomes smaller than the predetermined threshold after repetition of such a delay-difference control operation, the shift-amount decider 204 decides phase-shift amounts for making the delay difference between the two signals at the corresponding arms of the DQPSK modulator 102 sufficiently small. If the decided phase-shift amounts are set in the phase shifters 109a and 109b, the delay generators 110a and 110b adjust the delays of the data signals and the delay difference between the two signals at the corresponding arms of the DQPSK modulator 102 becomes sufficiently small. Accordingly, degradation of the DQPSK modulation signal is suppressed and a decrease in transmission performance of an optical transmission apparatus for transmitting optical signals is suppressed.

As described above, in accordance with this embodiment, reference voltage corresponding to signal power at a dip of a signal waveform is determined while raising the reference voltage to be compared with the signal waveform of a DQPSK modulation signal resulting from DQPSK modulation of data signals. Delays of the data signals input to the DQPSK modulator are adjusted so that the reference voltage corresponding to the signal power at the dip lowers. Accordingly, optimum delays decided in consideration of an error and a temperature change at the time of manufacturing of the apparatus can be generated in the two signals input to the DQPSK modulator, a delay difference between the two signals at the corresponding arms of the DQPSK modulator is made sufficiently small, and degradation of an optical signal can be suppressed. That is, even if RZ modulation is not performed on the DQPSK modulation signal, degradation of the optical signal can be suppressed by appropriately controlling the delay difference between the signals multiplexed in multi-level phase modulation.

Fourth Embodiment

In a fourth embodiment, influences, such as a change in output power of a light source, are eliminated by correcting peak power using signal power of a DQPSK modulation signal.

Figure 12:
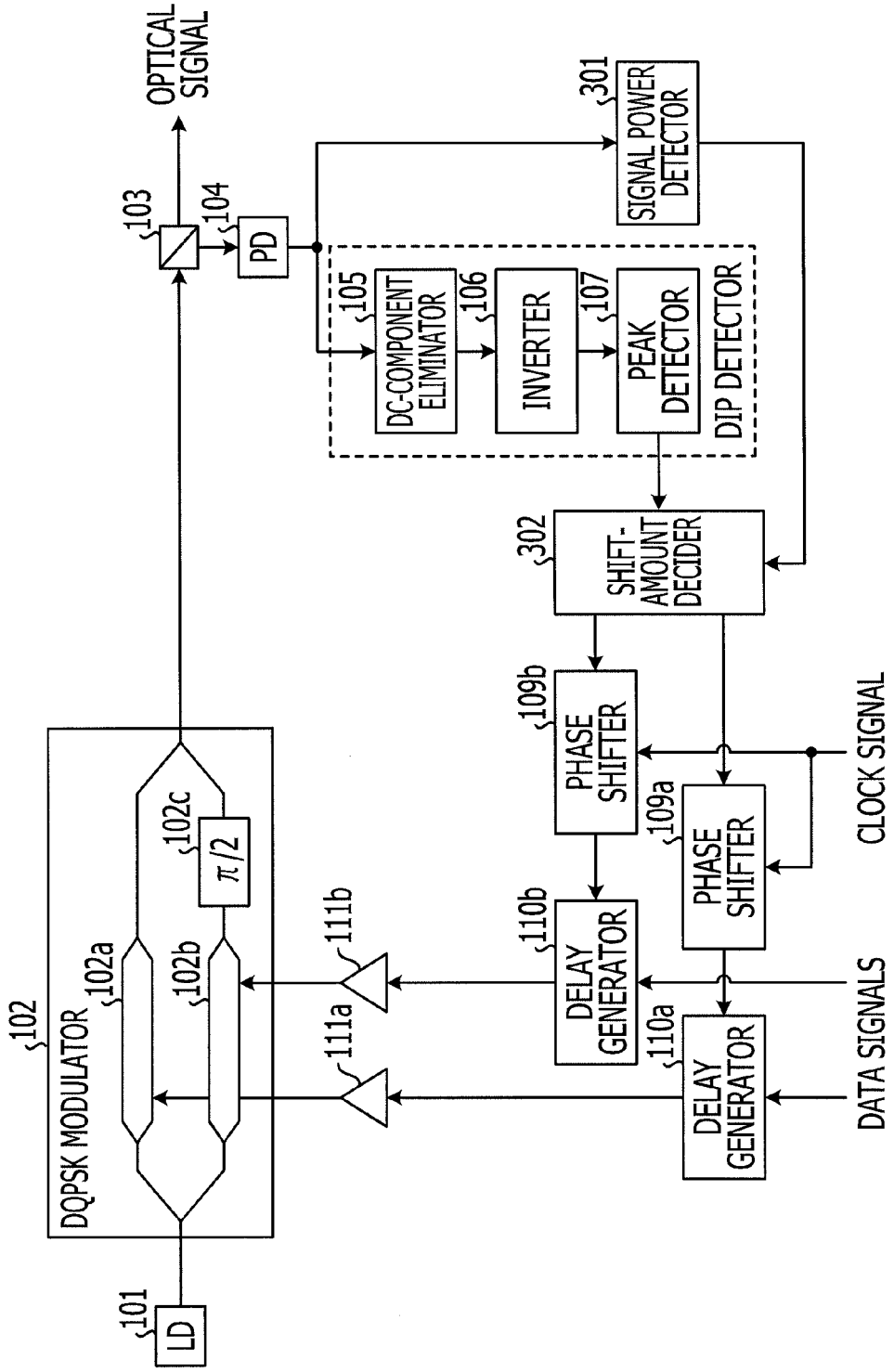
FIG. 12 is a block diagram illustrating a configuration of an optical modulation apparatus according to a fourth embodiment.

FIG. 12 is a block diagram illustrating a configuration of an optical modulation apparatus according to this embodiment. In FIG. 12, like reference characters designate the same or similar components illustrated in FIG. 3 to omit a description thereof. The optical modulation apparatus illustrated in FIG. 12 includes a shift-amount decider 302 instead of the shift-amount decider 108 illustrated in FIG. 3 and additionally includes a signal power detector 301.

The signal power detector 301 detects power of a signal output from a PD 104. In this embodiment, just like the second embodiment, a peak is detected in an inverted waveform of a multi-level phase modulation signal. Power at the peak can change because of changes in external factors, such as output power of an LD 101 and driving amplitude of a DQPSK modulator 102. These changes in the external factors are reflected in the signal output from the PD 104. Accordingly, the signal power detector 301 detects the signal power serving as a criterion for eliminating the influences caused by the changes in the external factors.

The shift-amount decider 302 decides phase-shift amounts of a clock signal set in phase shifters 109a and 109b based on power at a peak detected by a peak detector 107. More specifically, the shift-amount decider 302 changes the phase-shift amounts of the clock signal, thereby changing delays of data signals input to the DQPSK modulator 102. At this time, the shift-amount decider 302 corrects the power at the peak detected by the peak detector 107 using the signal power detected by the signal power detector 301. The shift-amount decider 302 changes the phase-shift amounts so that the corrected peak power increases. The shift-amount decider 302 then notifies the phase shifters 109a and 109b of the respective changed phase-shift amounts. The shift-amount decider 302 decides the phase-shift amounts in the same way as the shift-amount decider 108 according to the second embodiment except that the power at the peak is corrected using the signal power.

Figure 13:
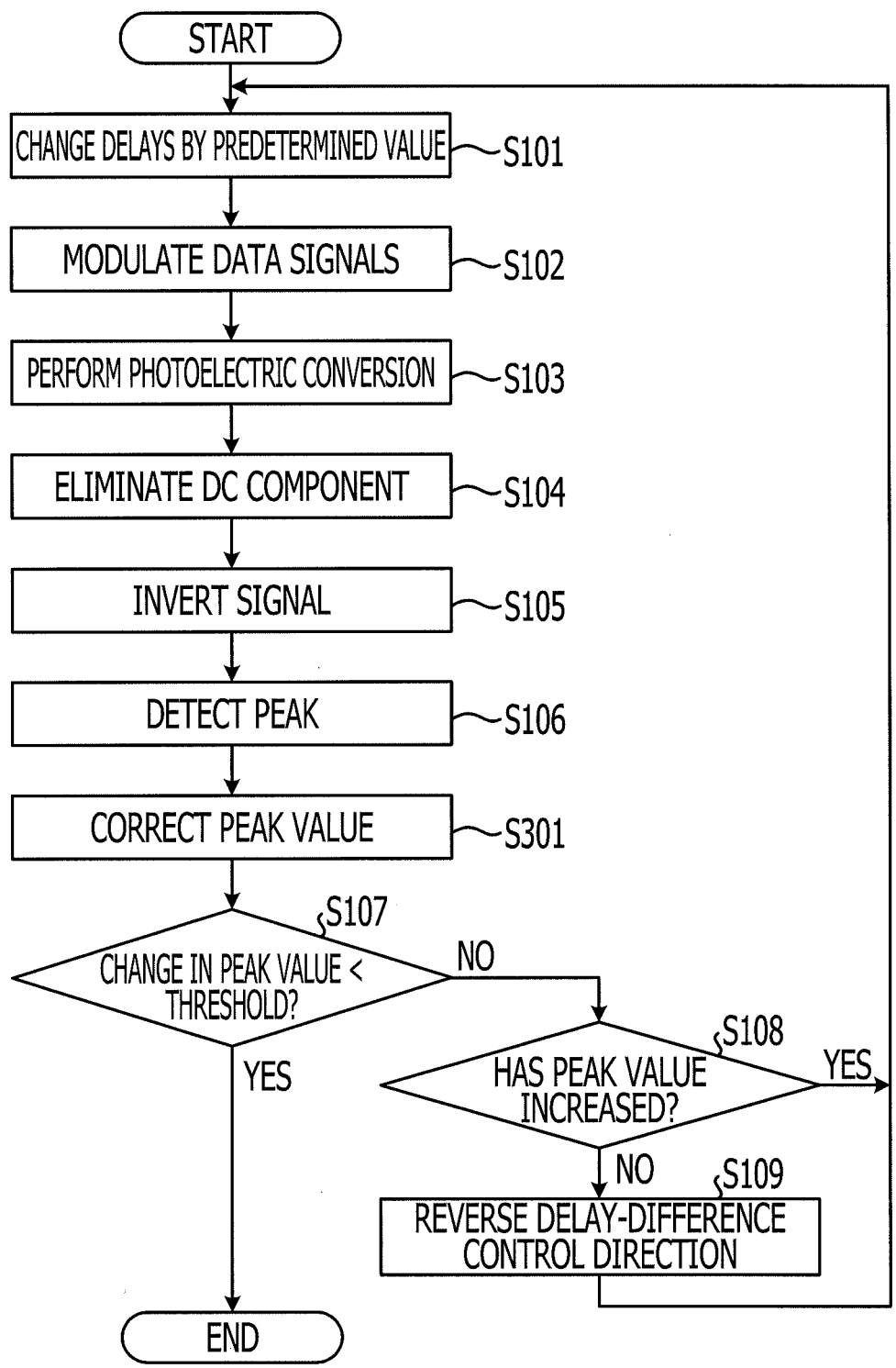
FIG. 13 is a flowchart illustrating a method for controlling a delay difference according to the fourth embodiment.

A delay-difference control method of the optical modulation apparatus having the foregoing configuration will now be described with reference to a flowchart illustrated in FIG. 13. In FIG. 13, like reference characters designate the same or similar operations illustrated in FIG. 6 to omit a detailed description thereof. FIG. 13 describes an operation performed when a change from power at a peak previously detected by the peak detector 107 to power at a peak detected this time is equal to or larger than a predetermined threshold. When the change in the power is smaller than the predetermined threshold, the delay-difference control is not needed because optimum phase-shift amounts are already decided by the shift-amount decider 302 and a delay difference between two signals at corresponding arms of the DQPSK modulator 102 is close to 0.

When the change in the power at the previous peak and this peak is equal to or larger than the predetermined threshold, the shift-amount decider 302 changes the phase-shift amounts set in the phase shifters 109a and 109b to change delays of data signals by a predetermined value (S101). At this time, the shift-amount decider 302 stores the power at the peak detected by the peak detector 107.

Upon receiving the data signals, delay generators 110a and 110b generate the delays changed by the predetermined value in the data signals and then outputs the delayed data signals to DRVs 111a and 111b, respectively. The DRVs 111a and 111b output the data signals to an I-arm modulator 102a and a Q-arm modulator 102b of the DQPSK modulator 102, where DQPSK modulation is executed (S102).

An optical coupler 103 splits the DQPSK modulation signal resulting from the DQPSK modulation and outputs one of the split signals as an optical signal. This optical signal is transmitted after predetermined transmission processing, for example, is performed thereon. The other signal is output to the PD 104. The PD 104 converts the optical signal into an electric signal (S103). A DC-component eliminator 105 eliminates a DC component of the resulting electric signal (S104) and inputs the signal to an inverter 106. The inverter 106 inverts a waveform of the signal (S105) and inputs the inverted signal waveform to the peak detector 107. The peak detector 107 detects a peak of the signal waveform (S106). The shift-amount decider 302 is notified of power at the peak detected by the peak detector 107.

The electric signal yielded by the PD 104 is also input to the signal power detector 301. The signal power detector 301 detects power of the signal. The signal power detected here reflects changes in external factors, such as output power of the LD 101 and driving amplitude in the DQPSK modulator 102. The shift-amount decider 302 uses the signal power detected by the signal power detector 301 to correct the power at the peak (S301). That is, the shift-amount decider 302 normalizes the power at the peak to yield power at the peak from which influences other than the delay difference at the corresponding arms of the DQPSK modulator 102 are eliminated.

The shift-amount decider 302 then determines whether a change between the corrected power at the peak previously detected and the corrected power at the peak detected this time is smaller than a predetermined threshold (S107). If the change in the power is smaller than the predetermined threshold (YES in S107), the shift-amount decider 302 determines that the delay difference is sufficiently small and is close to 0 and then terminates the delay-difference control operation. After the termination of the delay-difference control operation, phase-shift amounts currently set in the phase shifters 109a and 109b are continuously set as optimum phase-shift amounts. In this way, optimum delays are generated in the data signals input to the DQPSK modulator 102 by the delay generators 110a and 110b and the delay difference between the two signals at the corresponding arms of the DQPSK modulator 102 is made sufficiently small.

If the change in the peak power is equal to or larger than the predetermined threshold (NO in S107), the shift-amount decider 302 determines whether the peak power has increased from the previous one (S108). If the power has increased from the previous one (YES in S108), the shift-amount decider 302 changes the delays of the data signals by the predetermined value just like the last time (S101) because it is considered that the delay difference is controlled in the intended direction and the delay difference is approaching 0.

If the peak power has decreased from the previous one (NO in S108), the shift-amount decider 302 reverses the delay-difference control direction because it is considered that the delay difference is controlled in the unintended direction (S109). After reversing the control direction, the shift-amount decider 302 changes the delays of the data signals by the predetermined value (S101).

If the change between the previously corrected peak power and the peak power corrected this time becomes smaller than the predetermined threshold after repetition of the foregoing delay-difference control operation, the shift-amount decider 302 decides the phase-shift amounts for making the delay difference between the two signals at the corresponding arms of the DQPSK modulator 102 sufficiently small. If the decided phase-shift amounts are set in the phase shifters 109a and 109b, the delays of the data signals are adjusted by the delay generators 110a and 110b and the delay difference between the two signals at the corresponding arms of the DQPSK modulator 102 becomes sufficiently small. In this way, degradation of the DQPSK modulation signal is suppressed and a decrease in transmission performance of an optical transmission apparatus for transmitting optical signals can be suppressed.

As described above, in accordance with this embodiment, a peak is detected after inversion of a waveform of a DQPSK modulation signal resulting from DQPSK modulation of data signals and power at the detected peak is corrected based on power of the DQPSK modulation signal. Delays of the data signals input to the DQPSK modulator are adjusted so that the corrected peak power becomes maximum. Accordingly, optimum delays decided in consideration of an error and a temperature change at the time of manufacturing of the apparatus can be generated in the two signals input to the DQPSK modulator, a delay difference between the two signals at the corresponding arms of the DQPSK modulator is made sufficiently small, and degradation of an optical signal can be suppressed. That is, even if RZ modulation is not performed on the DQPSK modulation signal, the delay difference of the signals multiplexed in multi-level phase modulation is appropriately controlled and degradation of an optical signal can be suppressed.

Since the peak power is corrected based on the power of the DQPSK modulation signal, influences of changes in external factors, such as output power of a light source, can be eliminated and the delay difference can be accurately controlled.

Other Embodiments

Although the optical coupler splits a signal resulting from multi-level phase modulation and a dip of the split signal is detected in each of the first to fourth embodiments, phase conjugate light may be used. More specifically, when a Mach-Zehnder interferometer is used in the multi-level phase modulation of signals, phase conjugate light is output with a modulation signal. Accordingly, a delay difference can be controlled by detecting a dip of the phase conjugate light instead of the modulation signal.

Figure 14:
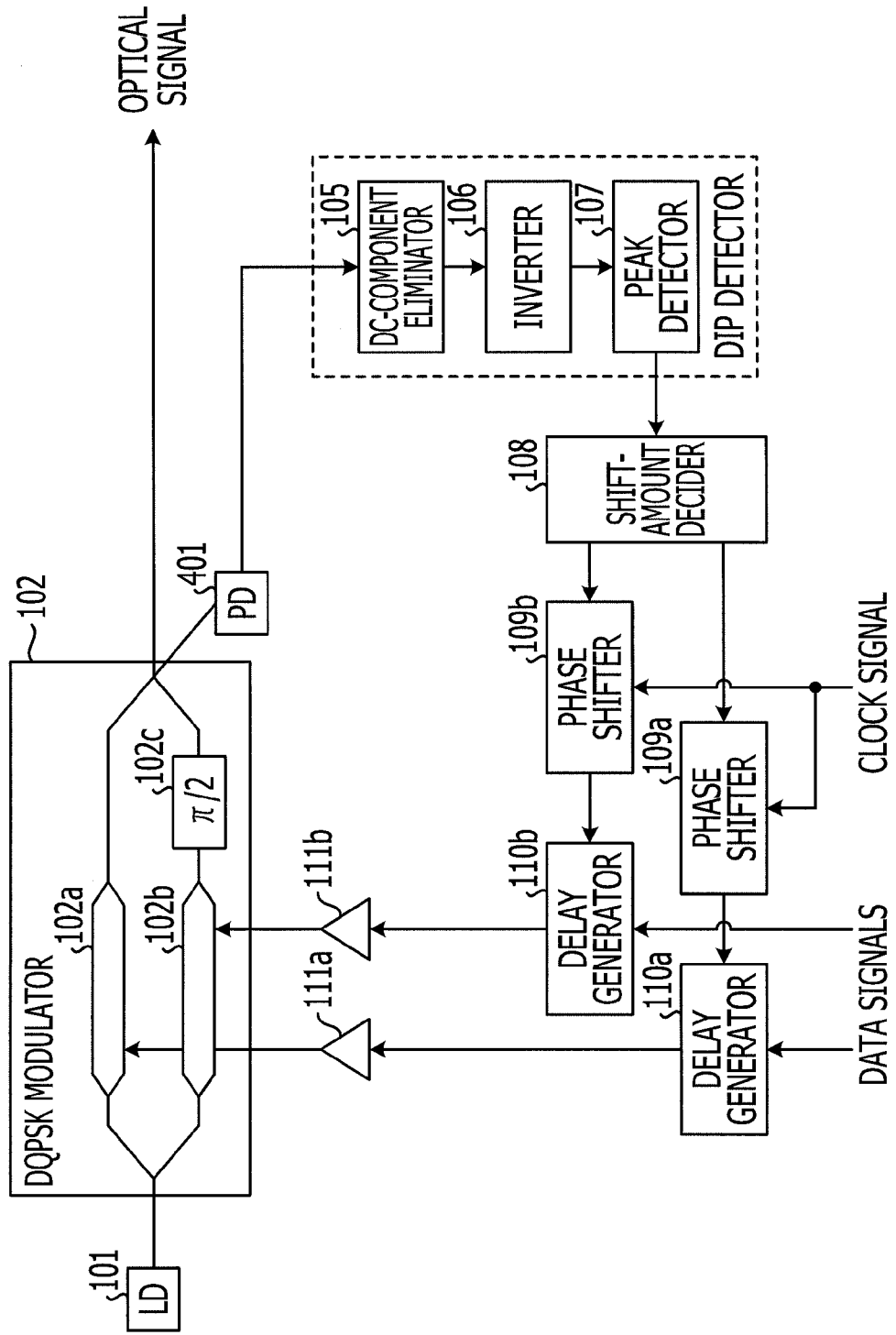
FIG. 14 is a block diagram illustrating an alteration of the optical modulation apparatus.

FIG. 14 is a block diagram illustrating a configuration of an optical modulation apparatus using phase conjugate light. This optical modulation apparatus includes a PD 401. The PD 401 detects phase conjugate light output from a DQPSK modulator 102. Since the phase conjugate light is phase conjugate with a DQPSK modulation signal output from the DQPSK modulator 102, a dip detected in the phase conjugate light is equivalent to a dip detected in the DQPSK modulation signal. Accordingly, the optical modulation apparatus illustrated in FIG. 14 eliminates a DC component from the phase conjugate light and then inverts a waveform of the phase conjugate light before detecting a peak. Delays of the signals input to the DQPSK modulator 102 are adjusted in accordance with power at the detected peak.

The use of the phase conjugate light can prevent degradation of the DQPSK modulation signal caused by the optical coupler. Accordingly, when an optical signal resulting from the DQPSK modulation is transmitted, a decrease in transmission performance can be suppressed.

In each of the foregoing first to fourth embodiments, the optical modulation apparatus has been described that does not perform RZ modulation after multi-level phase modulation. However, the RZ modulation may be performed after the multi-level phase modulation. More specifically, dip detection is performed on one of signals resulting from split of a modulation signal by the optical coupler, whereas the RZ modulation may be performed on the other split signal.

Figure 15:
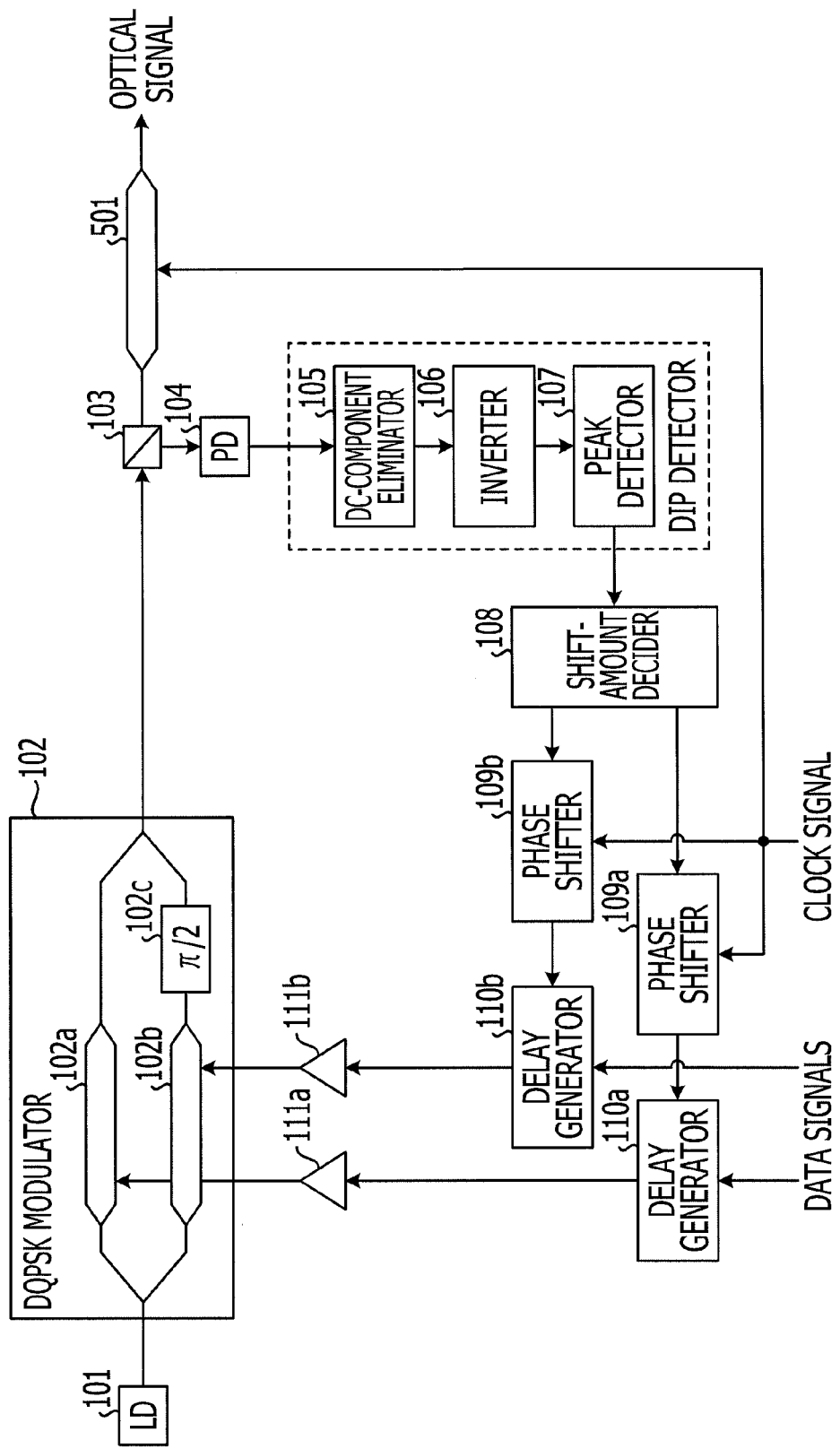
FIG. 15 is a block diagram illustrating another alteration of the optical modulation apparatus.
Figure 16:
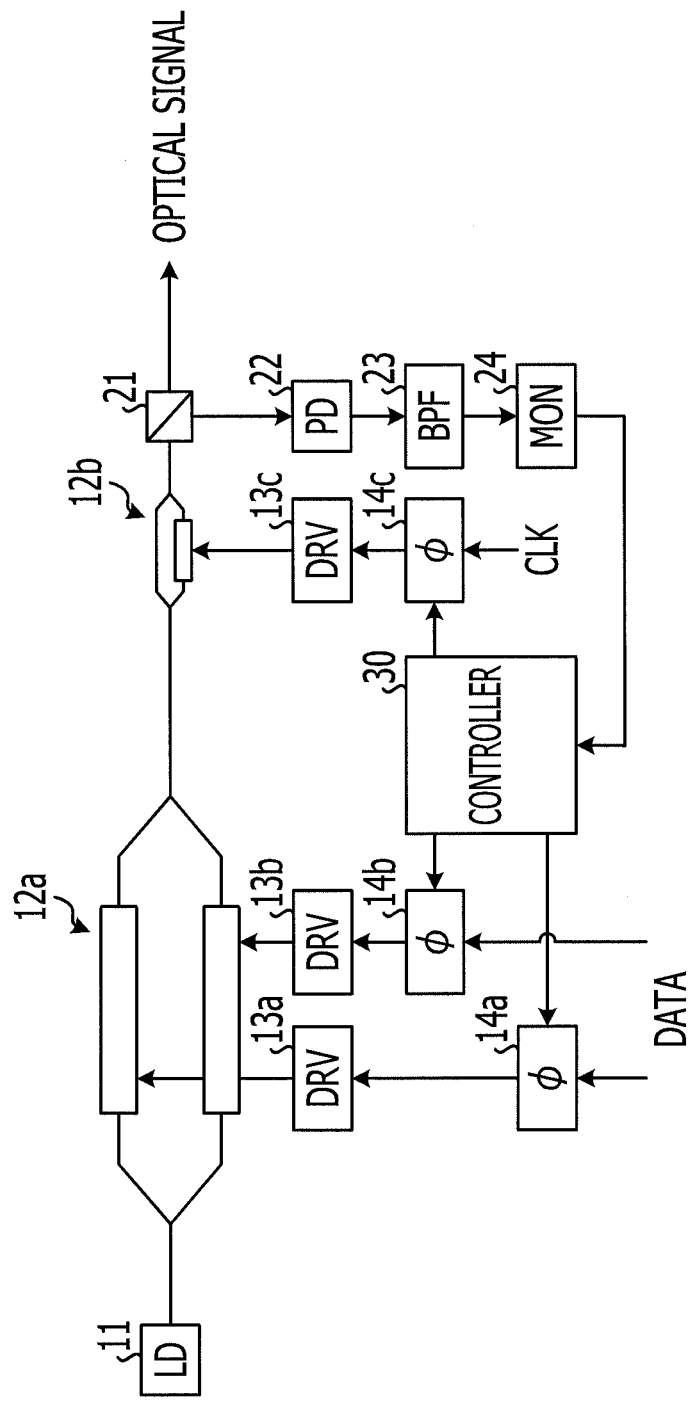
FIG. 16 is a block diagram illustrating a configuration of an optical modulation apparatus including an RZ modulator.
Figure 17:
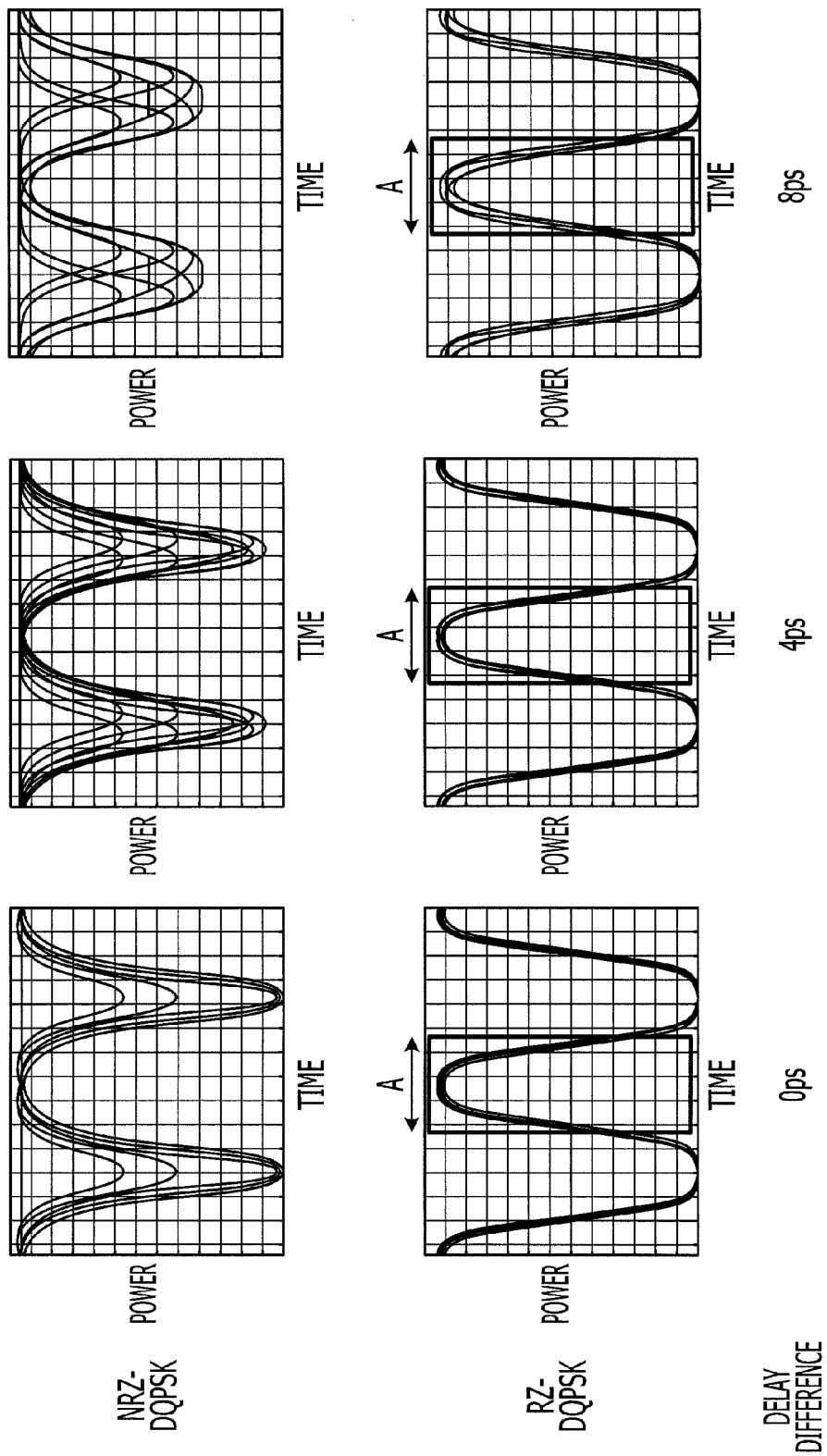
FIG. 17 is a diagram illustrating specific examples of a change in signal waveforms caused by a delay difference.
Figure 18:
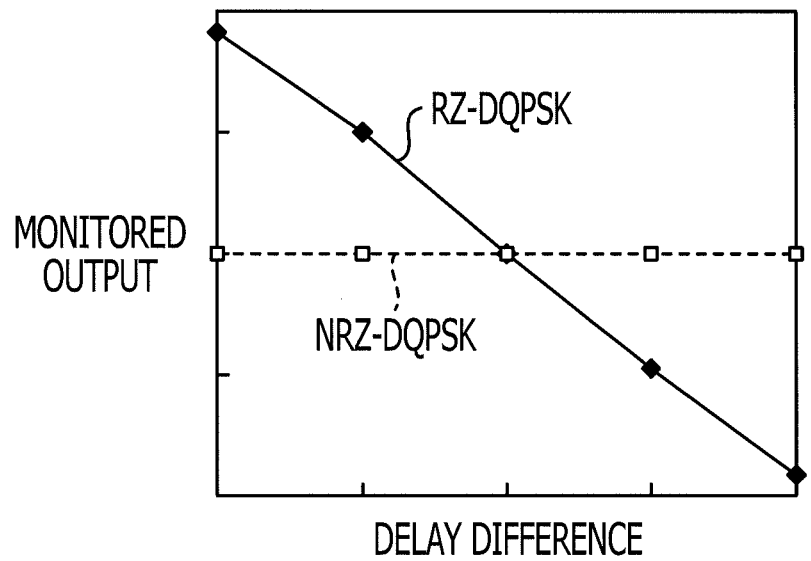
FIG. 18 is a diagram illustrating a difference in monitored output power resulting from different modulation methods.

FIG. 15 is a block diagram illustrating an optical modulation apparatus including an RZ modulator. This optical modulation apparatus includes an RZ modulator 501. The RZ modulator 501 performs RZ modulation on a DQPSK modulation signal. An optical signal resulting from the RZ modulation is output form the RZ modulator 501. An optical coupler 103 is disposed between a DQPSK modulator 102 and the RZ modulator 501. A dip of a split signal is detected and delays of two signals input to the DQPSK modulator 102 are adjusted.

Although desired delays are generated in data signals by shifting a phase of a clock signal in each of the foregoing second to fourth embodiments, the delay adjusting method is not limited to this one. More specifically, the desired delays may be generated by directly shifting phases of the data signals based on peak power or reference voltage.

Furthermore, it is assumed, in each of the foregoing second to fourth embodiments, that DQPSK modulation is performed as an example of multi-level phase modulation. However, even if other multi-level phase modulation is performed, a delay difference can be controlled based on a dip detected from a waveform of a signal resulting from the multi-level phase modulation. Additionally, the modulation method is not limited to the multi-level phase modulation. For example, when a plurality of polarized components are multiplexed, for example, in polarization multiplexing, a delay difference between the plurality of polarized components can be controlled based on a dip. That is, when a plurality of signal components are multiplexed, a dip is detected in a waveform of an optical signal resulting from multiplexing and delays of the plurality of signal components are adjusted so that the dip deepens, whereby a delay difference between the plurality of signal components can be decreased.

According to one embodiment of optical modulation apparatuses and optical modulation methods disclosed herein, a delay difference between a plurality of signals to be multiplexed is appropriately controlled and degradation of an optical signal resulting from multiplexing of the plurality of signals can be advantageously suppressed.

According to an aspect of the embodiments of the invention, any combinations of one or more of the described features, functions, operations, and/or benefits can be provided. A combination can be one or a plurality. The embodiments are not limited to the first and second input signals. Two or more inputs signals may be provided. The embodiments can be implemented as an apparatus (a machine) that includes the described optical modulation components and/or further include and/or be provided with computing hardware and/or in computing device (i.e., computing apparatus), such as (in a non-limiting example) any computer that can store, retrieve, process and/or output data and/or communicate (network) with other computers. According to an aspect of an embodiment, the described features, functions, operations, and/or benefits can use and/or be implemented by computing hardware and/or software, for example, for generating and/or storing threshold values, data signals, etc. Computing hardware apparatus can comprise a controller (CPU) (e.g., a hardware logic circuitry based computer processor that processes or executes instructions, namely software/program), computer readable media, transmission communication interface (network interface), and/or an output device, for example, a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be output to an output device, for example, displayed on the display.

A program/software implementing aspects of the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing aspects of the embodiments may be transmitted over a transmission communication path, e.g., a wire and/or a wireless network implemented via hardware. An example of communication media via which the program/software may be sent includes, for example, a carrier-wave signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention, the scope of which is defined in the claims and their equivalents.

What is claimed is:

1. An optical modulation apparatus comprising:
a first modulator configured to modulate light emitted by a light source using a first input signal and output a first modulated signal;
a second modulator configured to modulate the light using a second input signal and output a second modulated signal;
a multiplexer configured to multiplex the first and second modulated signals and output a multiplexed signal;
a detector configured to detect a dip where power in a waveform of the multiplexed signal is equal to or smaller than a predetermined value by inverting the waveform of the multiplexed signal and detecting a peak in the waveform inverted; and
an adjustor configured to adjust a delay between the first input signal and the second input signal based on the power at the dip.

2. The optical modulation apparatus according to claim 1, wherein the detector detects the dip where the power is minimum.

3. The optical modulation apparatus according to claim 1, wherein the detector includes:
a comparator configured to compare a signal voltage in response to the power of the multiplexed signal with a reference voltage;
a supplier configured to raise the reference voltage supplied to the comparator when a comparison result by the comparator indicates that the signal voltage is equal to or larger than the reference voltage; and
a notifier configured to notify the adjustor of the reference voltage compared with the signal voltage when a comparison result by the comparator indicates that the signal voltage is smaller than the reference voltage, the notified reference voltage serving as an index value of the power at the dip.

4. The optical modulation apparatus according to claim 1, further comprising:
a signal power detector configured to detect signal power of the multiplexed signal, wherein
the adjustor corrects the power at the dip detected by the detector using the signal power detected by the signal power detector and adjusts the delay between the first input signal and the second input signal based on corrected power at the dip.

5. The optical modulation apparatus according to claim 1, wherein
the detector detects the dip from a phase conjugate light that is phase conjugate with the multiplexed signal, the phase conjugate light being output at a time of multiplexing of the first and second modulated signals.

6. The optical modulation apparatus according to claim 1, further comprising:
a return-to-zero (RZ) modulator configured to perform RZ modulation on the multiplexed signal, wherein
the detector detects the dip from the multiplexed signal before the RZ modulation is performed.

7. The optical modulation apparatus according to claim 1, wherein
the adjustor changes a delay difference between the first and second input signals by a predetermined value.

8. The optical modulation apparatus according to claim 7, wherein
the adjustor stops changing the delay difference when a change between a power at a dip detected by the detector previous time and a power at a dip detected currently is smaller than a predetermined threshold.

9. The optical modulation apparatus according to claim 7, wherein
the adjustor reverses a direction of changing the delay difference when the power at the dip detected by the detector has increased as a result of changing the delay difference by the predetermined value.

10. The optical modulation apparatus according to claim 1, wherein the adjustor includes:
a decider configured to decide two different phase-shift amounts of a clock signal based on the power at the dip detected by the detector;
a shifter configured to shift a phase of the clock signal by each of the phase-shift amounts decided by the decider; and
a generator configured to generate a delay between the first input signal and the second input signal based on the clock signals whose phases are shifted by the shifter, respectively.

11. An optical modulation method comprising:
modulating light using a first input signal and outputting a first modulated signal;
modulating the light using a second input signal different from the first input signal and outputting a second modulated signal;
multiplexing the first and second modulated signals and outputting a multiplexed signal;
detecting a dip where power is equal to or smaller than a predetermined value in a waveform of the multiplexed signal by inverting the waveform of the multiplexed signal and detecting a peak in the waveform inverted; and
adjusting a delay between the first input signal and the second input signal based on the power at the dip.

12. An optical modulation device comprising:
a modulator configured to modulate lights emitted by a light source using first and second input signals and output modulated signals;
a detector configured to detect a dip where power in a waveform of a multiplexed signal of the modulated signals is equal to or smaller than a predetermined value by inverting the waveform of the multiplexed signal and detecting a peak in the waveform inverted; and
an adjustor configured to adjust a delay between the first input signal and the second input signal based on the power at the dip.

* * * * *